(12) United States Patent
Watariuchi

(10) Patent No.: US 11,277,527 B2
(45) Date of Patent: Mar. 15, 2022

(54) SYSTEM HAVING AN APPARATUS, A SERVER, AND A TERMINAL THAT TRANSMITS AN IDENTIFIER OF AN APPLICATION ON THE TERMINAL TO THE SERVER

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/917,443

(22) Filed: Jun. 30, 2020

(65) Prior Publication Data

US 2021/0006667 A1 Jan. 7, 2021

(30) Foreign Application Priority Data

Jul. 5, 2019 (JP) .............................. JP2019-126342

(51) Int. Cl.
*H04N 1/00* (2006.01)

(52) U.S. Cl.
CPC ..... *H04N 1/00217* (2013.01); *H04N 1/00464* (2013.01); *H04N 1/00474* (2013.01); *H04N 1/00477* (2013.01)

(58) Field of Classification Search
None
See application file for complete search history.

(56) References Cited

U.S. PATENT DOCUMENTS

| 2014/0347690 A1* | 11/2014 | Sato ................... H04N 1/32144 358/1.15 |
| 2020/0073608 A1* | 3/2020 | Tanaka ................. G06F 3/1293 |
| 2020/0329162 A1* | 10/2020 | Watariuchi ......... H04N 1/00464 |

FOREIGN PATENT DOCUMENTS

| GN | 107179887 A | 9/2017 |
| GN | 108933876 A | 12/2018 |
| JP | 2006-109411 A | 4/2006 |
| JP | 2014-154969 A | 8/2014 |
| JP | 2017-108338 A | 6/2017 |

* cited by examiner

*Primary Examiner* — Dov Popovici
(74) *Attorney, Agent, or Firm* — Canon U.S.A., Inc. IP Division

(57) ABSTRACT

According to some embodiments, a system includes an apparatus, a server, and a terminal. The terminal obtains an identifier of an application executed on the terminal, and transmits the obtained identifier of the application to the server. The server includes a storage storing an identifier of an application and information indicating a predetermined process in association with each other, wherein the predetermined process is a process using a function included in the apparatus. The server receives the transmitted identifier of the application from the terminal, and transmits the information indicating the predetermined process which is associated with the received identifier of the application to the apparatus. The apparatus receives the transmitted information indicating the predetermined process from the server, and executes the predetermined process corresponding to the received information indicating the predetermined process.

19 Claims, 23 Drawing Sheets

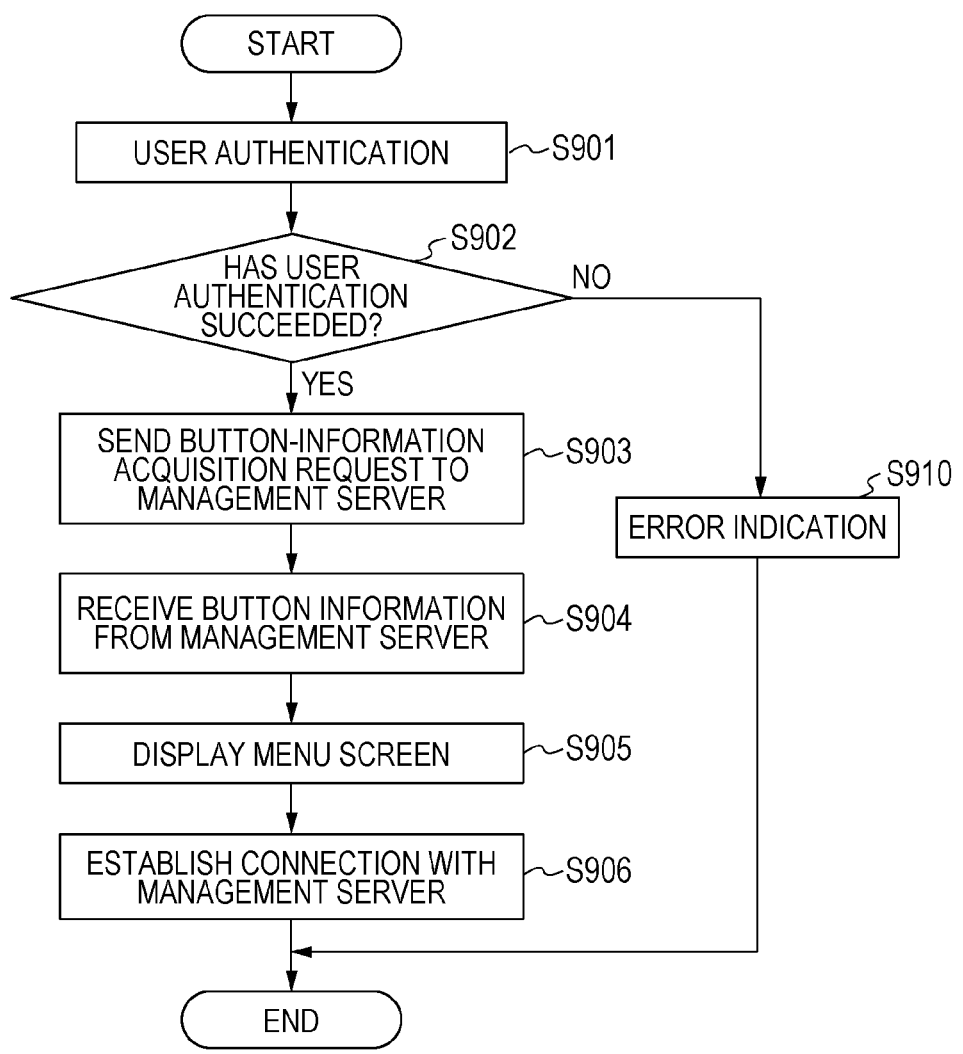

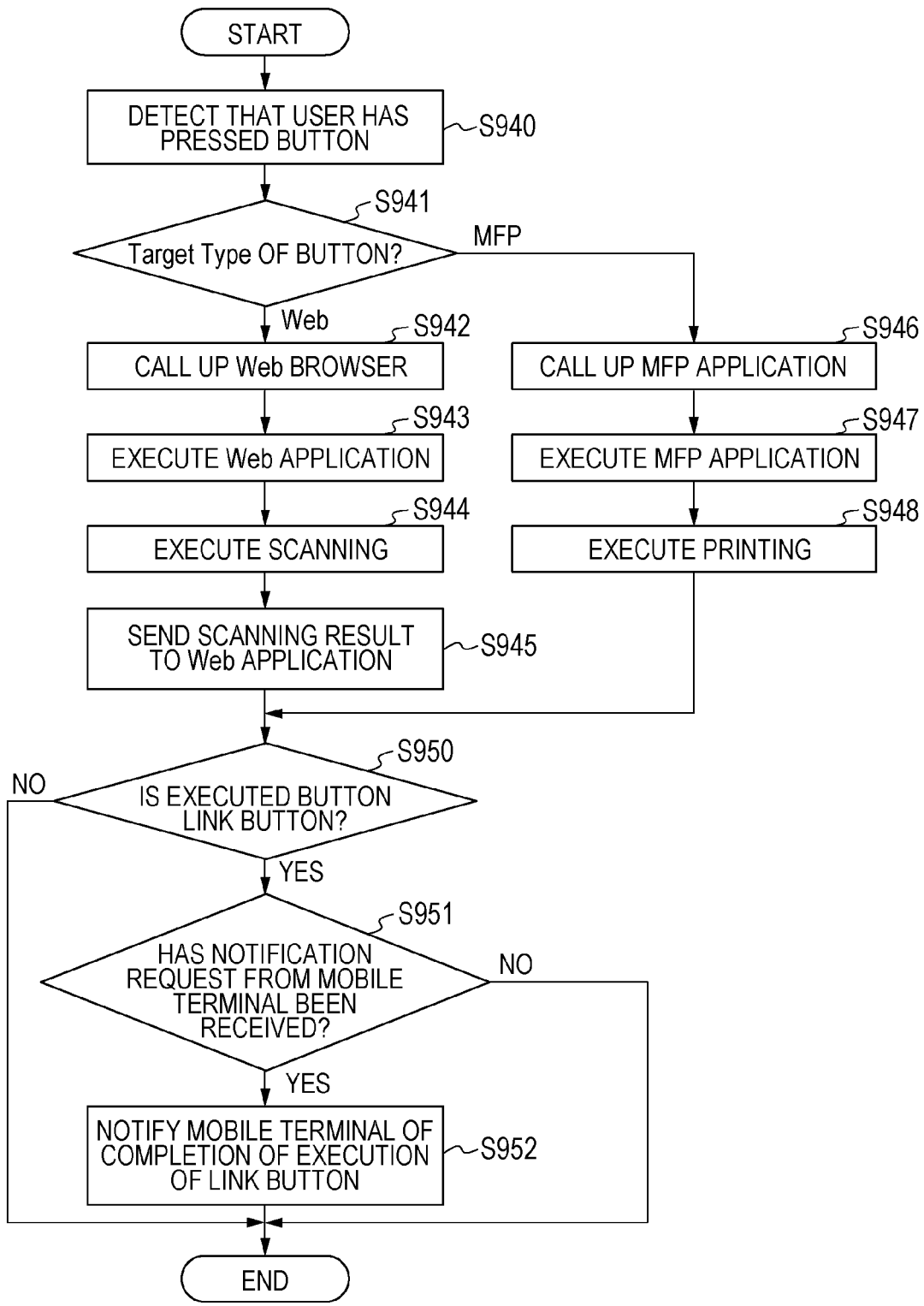

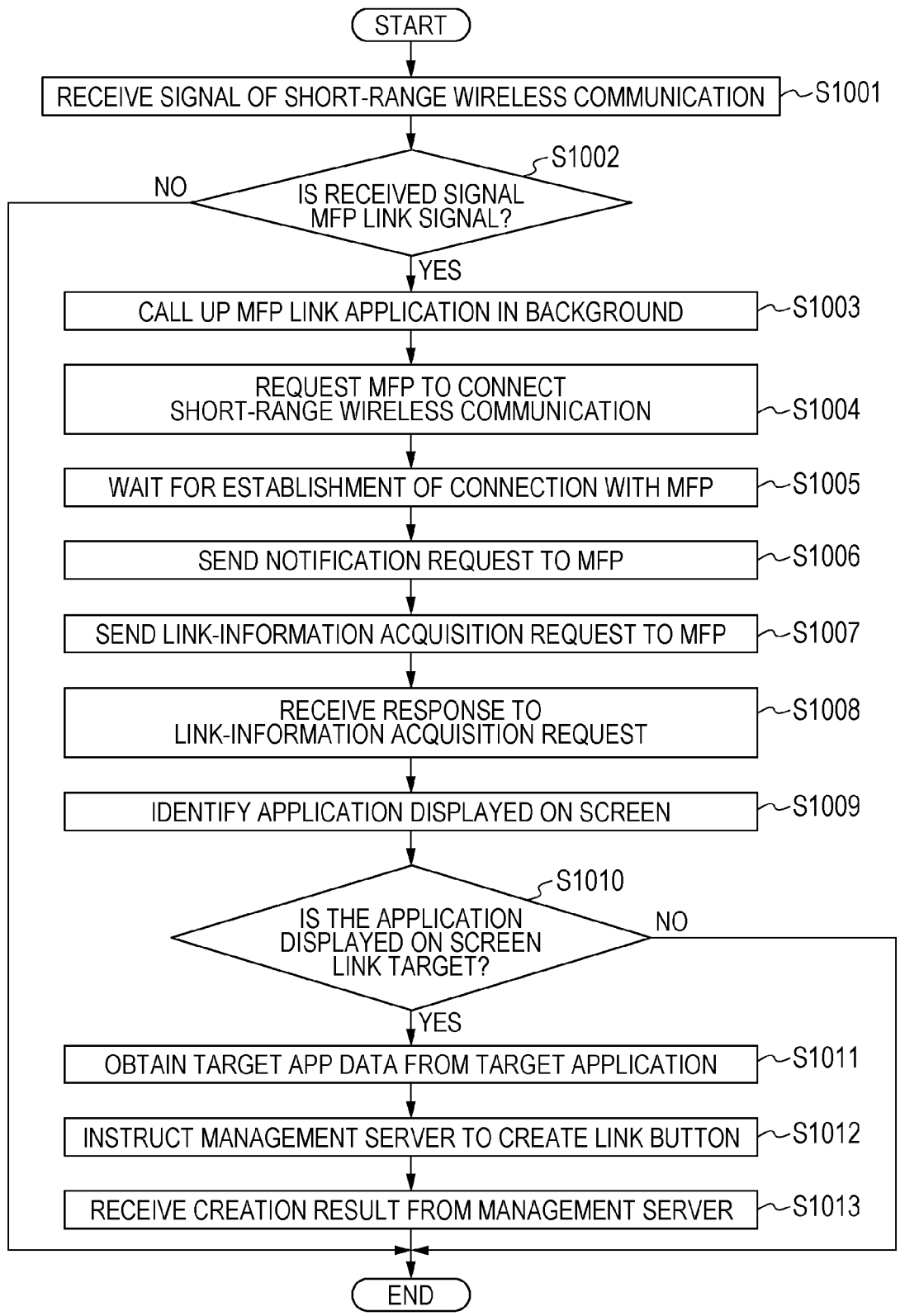

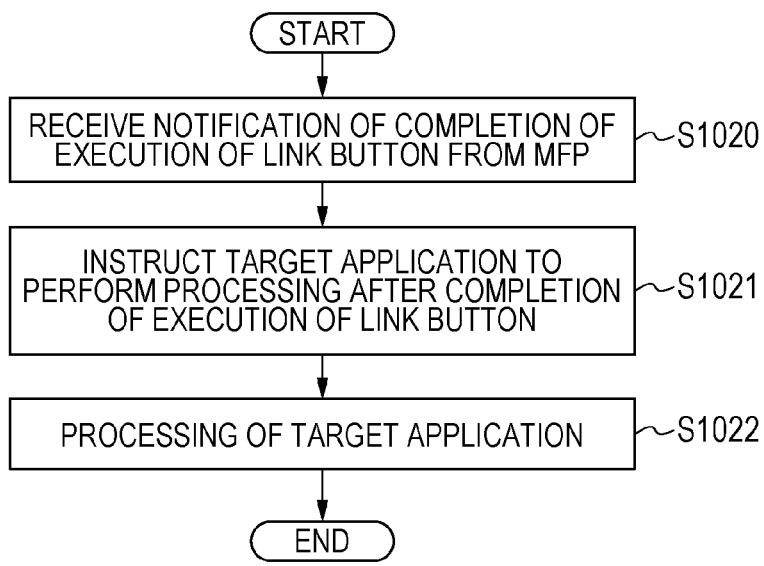
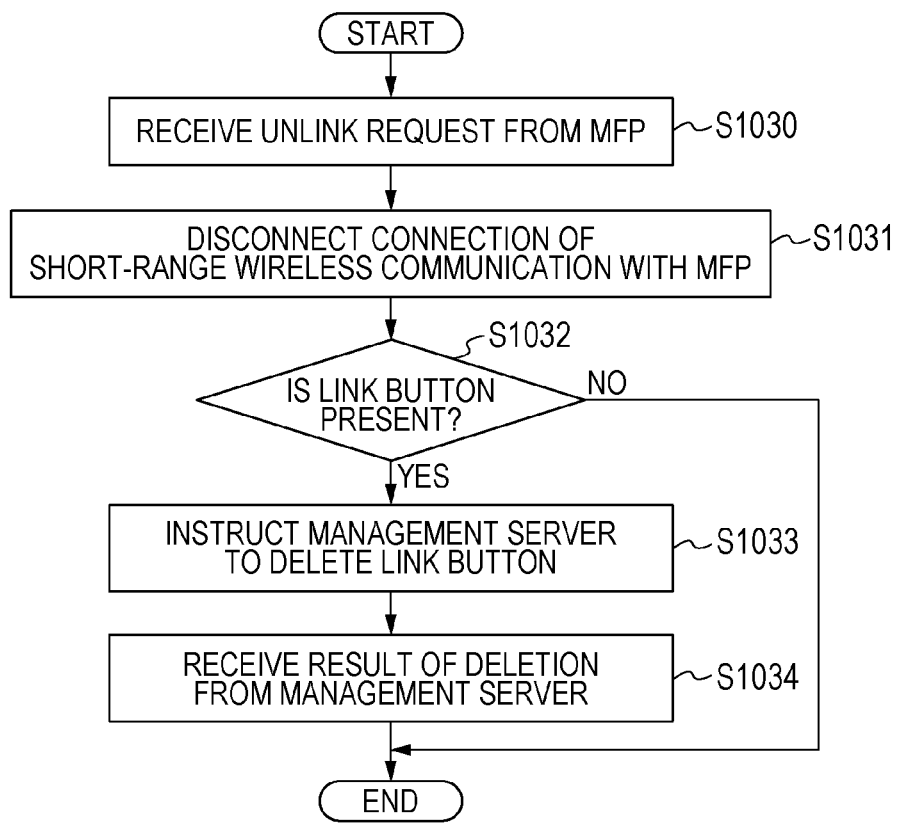

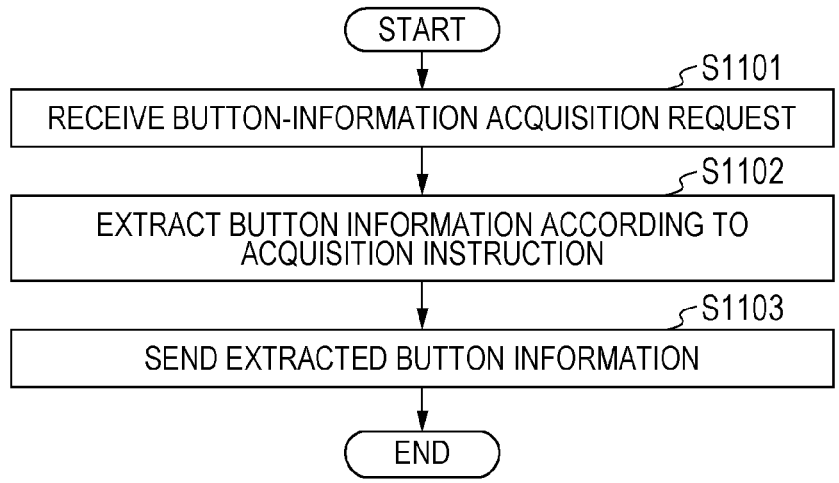
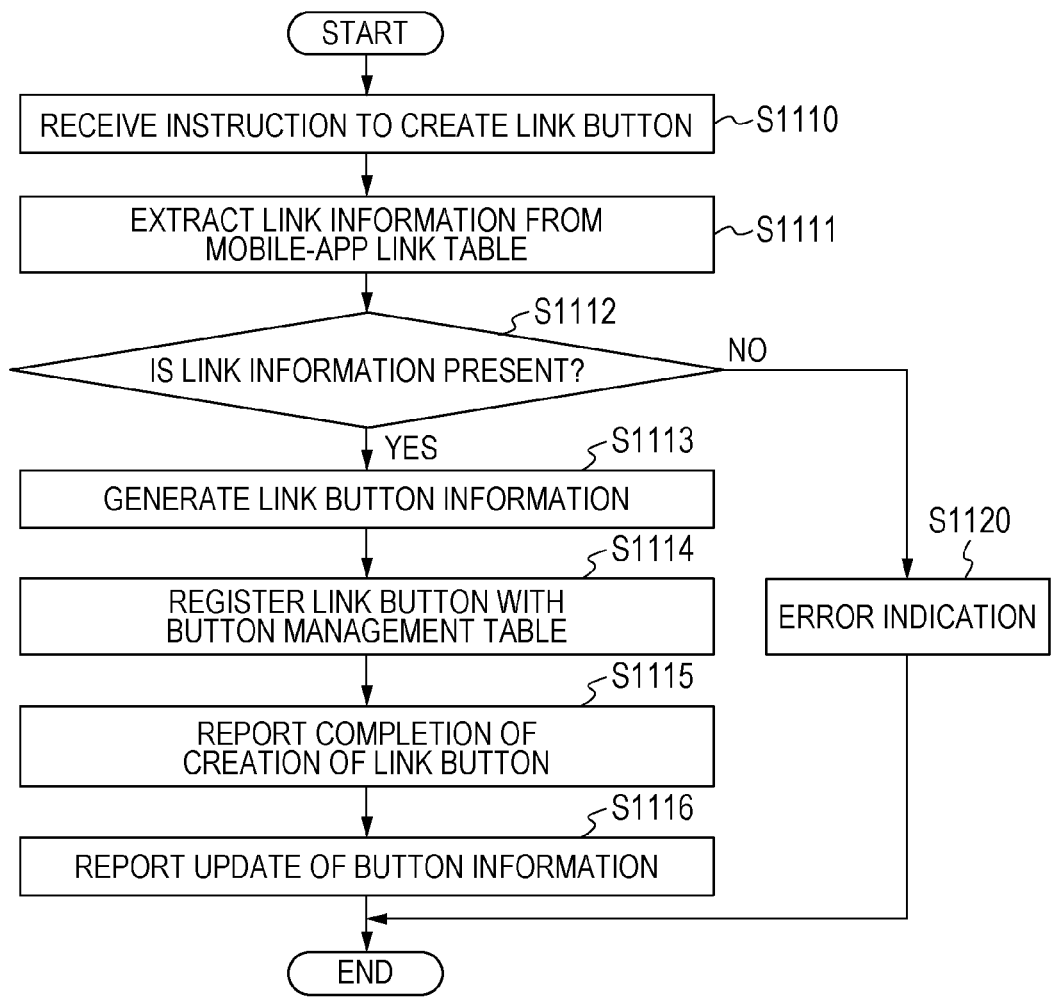

FIG. 12A

| 1201 | 1202 | 1203 | 1204 | 1205 | 1206 | 1207 | 1208 |
|---|---|---|---|---|---|---|---|
| ButtonID | Button Type | ButtonName | Target Type | ButtonTarget | ButtonParameter | View Order | User ID |
| b001 | Shared | COPY | MFP | copy.jar | | 1 | |
| b002 | Shared | SCAN AND SEND | MFP | send.jar | | 2 | |
| b003 | Shared | SCAN AND STORE | MFP | userbox.jar | -mode:input | 3 | |
| b004 | Shared | USE STORED FILE | MFP | userbox.jar | -mode:output | 4 | |
| b005 | Shared | USE Web FILE | Web | https://example.org/ | | 5 | |
| ... | ... | ... | ... | ... | ... | ... | ... |
| b101 | Personal | 2in1 COPY | MFP | copy.jar | -nup:2 | 10 | u001 |
| b111 | Personal | EMAIL TO CUSTOMER | MFP | send.jar | -input:scan-type:email-to:taro@example.net | 10 | u002 |
| ... | ... | ... | ... | ... | ... | ... | ... |

FIG. 12B

| ButtonID | Button Type | ButtonName | Target Type | ButtonTarget | ButtonParameter | View Order | User ID |
|---|---|---|---|---|---|---|---|
| b201 | MobileLink | SCAN AND STORE IN WebDrive(/my/folder) | Web | https://drive.example.com/scan | filetype=pdf&resolution=300dpi&destination=/my/folder | -1 | u001 |

FIG. 12C

| ButtonID | Button Type | ButtonName | Target Type | ButtonTarget | ButtonParameter | View Order | User ID |
|---|---|---|---|---|---|---|---|
| b202 | MobileLink | SCAN AND EMAIL TO ichiro@example.net | MFP | send.jar | -input:scan -type:email -to:ichiro@example.net | -1 | u002 |

FIG. 13

| ID 1301 | Mobile AppID 1302 | Button Name 1303 | Target Type 1304 | Button Target 1305 | Button Parameter 1306 | Mobile Param Name 1307 | Mobile ParamKey 1308 |
|---|---|---|---|---|---|---|---|
| m001 | WebDrive | SCAN AND STORE IN WebDrive(%current path%) | Web | https://drive.example.com/scan | filetype=pdf&resolution =300dpi | destination | current path |
| m002 | PhotoBox | SCAN AND STORE IN PhotoBox(%album name%) | Web | https://example.net/photobox | run=scan&file=jpg | box | album name |
| m003 | Addressbook | SCAN AND EMAIL TO %email% | MFP | send.jar | -input:scan -type:email | to | email |
| m004 | DocWriter | PRINT DocWriter DOCUMENT | MFP | print.jar | -color:fullcolor | data | print data |
| ... | | | | | ... | | |

FIG. 15

| ID | Mobile AppID | Mobile AppStatus | Button Name | Target Type | ButtonTarget | Button Parameter | Mobile Param Name | Mobile ParamKey |
|---|---|---|---|---|---|---|---|---|
| | 1302 | 1501 | 1303 | 1304 | 1305 | 1306 | 1307 | 1308 |
| m101 | WebDrive | path view | SCAN AND STORE IN WebDrive(%current paht%) | Web | https://drive.example.com/scan | filetype=pdf&resolution=300dpi | destination | current path |
| m102 | WebDrive | document view | PRINT WebDrive DOCUMENT | Web | https://drive.example.com/print | filetype=pdf&resolution=600dpi | print | print data |
| m103 | PhotoBox | AlbumMode | SCAN AND STORE IN PhotoBox(%album name%) | Web | https://example.net/photobox | run=scan&file=jpg | album | album name |
| m104 | PhotoBox | AlbumMode | PRINT PhotoBox(%album name%) IN ALBUM | Web | https://example.net/photobox | run=albumprint&size=A4 | photo | print data |
| m105 | PhotoBox | PhotoMode | PRINT PHOTO IN PhotoBox ON POSTCARD | Web | https://example.net/photobox | run=photoprint&size=postcard | photo | print data |
| m106 | Addressbook | * | SCAN AND EMAIL TO %email% | MFP | send.jar | -input:scan -type:email | to | email |
| m107 | DocWriter | * | PRINT DocWriter DOCUMENT | MFP | print.jar | -color:fullcolor | data | print data |
| ... | | | | | | | | ... |

FIG. 16

| ButtonID 1201 | Button Type 1202 | ButtonName 1203 | Target Type 1204 | ButtonTarget 1205 | ButtonParameter 1206 | View Order 1207 | User ID 1208 |
|---|---|---|---|---|---|---|---|
| b301 | MobileLink | SCAN AND STORE IN PhotoBox(birthday2018) | Web | https://example.net/photobox | run=scan&file=jpd&albume=birthday2018 | -1 | u001 |
| b302 | MobileLink | PRINT PhotoBox(birthday2018) IN ALBUM | Web | https://example.net/photobox | run=albumeprint&size=A4 | -2 | u001 |

SYSTEM HAVING AN APPARATUS, A SERVER, AND A TERMINAL THAT TRANSMITS AN IDENTIFIER OF AN APPLICATION ON THE TERMINAL TO THE SERVER

BACKGROUND

Field

The present disclosure relates to a technique for linking a plurality of image processing apparatuses.

Description of the Related Art

In recent years, image processing apparatuses installed in offices are increasingly equipped with a function of exchanging data with mobile terminals. Known examples include a technique for transmitting print data to a multifunction peripheral (MFP) with a mobile terminal to execute printing and a technique for loading image data read with a scanner of an MFP into a mobile terminal. Another example is a technique for an MFP to receive transmission setting information from a mobile terminal and perform mail transmission processing that reflects the received transmission setting information (Japanese Patent Application Laid-Open No. 2017-108338).

Various applications have recently been utilized on mobile terminals, and it has become common for users to install desired applications and use them on mobile terminals. Examples include a cloud storage application for managing document data using a cloud and a photo management application for managing photo data. By linking such applications with an MFP, part of the processing of the applications can be performed on the MFP.

However, loading image data scanned with an MFP into an application or printing image data in an application with an MFP by linking the application to the MFP as described above requires predetermined setting operations, and the operations may be difficult. Thus, it is difficult to operate the MFP to execute the processing according the application.

SUMMARY

A system includes an image processing apparatus, a server configured to communicate with the image processing apparatus, and an information processing apparatus capable of executing an application. The information processing apparatus includes a first memory and a first processor in communication with the first memory, wherein the first processor performs obtaining an identifier of an application executed on the information processing apparatus and notifying the server of the obtained identifier of the application. The server includes a second memory and a second processor in communication with the second memory, wherein the second processor performs storing the identifier of the application and information indicating a predetermined process according to the application in advance in association with each other and transmitting the information indicating the predetermined process to the image processing apparatus. The image processing apparatus includes a third memory and a third processor in communication with the third memory, wherein the third processor performs executing processing based on the transmitted information indicating the predetermined process. Wherein, in the transmitting, the information indicating the predetermined process according to the notified identifier of the application is transmitted to the image processing apparatus based on the stored information, and in the executing, the processing based on the transmitted information is executed.

Further features will become apparent from the following description of exemplary embodiments with reference to the attached drawings.

BRIEF DESCRIPTION OF THE DRAWINGS

FIG. 9A is a flowchart illustrating processing of the MFP according to an embodiment.

FIG. 9D is a flowchart illustrating processing of the MFP according to an embodiment.

FIG. 10A is a flowchart illustrating processing of the mobile terminal according to an embodiment.

FIG. 10B is a flowchart illustrating processing of the mobile terminal according to an embodiment.

FIG. 10C is a flowchart for illustrating processing of the mobile terminal according to an embodiment.

FIG. 11A is a flowchart illustrating processing of the management server according to an embodiment.

FIG. 11B is a flowchart illustrating processing of the management server according to an embodiment.

FIG. 12A illustrates an example of a button management table according to an embodiment.

FIG. 12B illustrates an example of the button management table according to an embodiment.

FIG. 12C illustrates an example of the button management table according to an embodiment.

FIG. 13 illustrates an example of a mobile-app link table according to an embodiment.

FIG. 15 illustrates an example of a mobile-app link table according to a second embodiment.

FIG. 16 illustrates a button management table according to the second embodiment.

DESCRIPTION OF THE EMBODIMENTS

An exemplary embodiment will be described herein below with reference to the accompanying drawings. It is to be understood that the following embodiments are not intended to limit the disclosure according to the appended claims and that not all of combinations of the features described in the embodiments are not absolutely necessary for the disclosure.

First Embodiment

Figure 1:
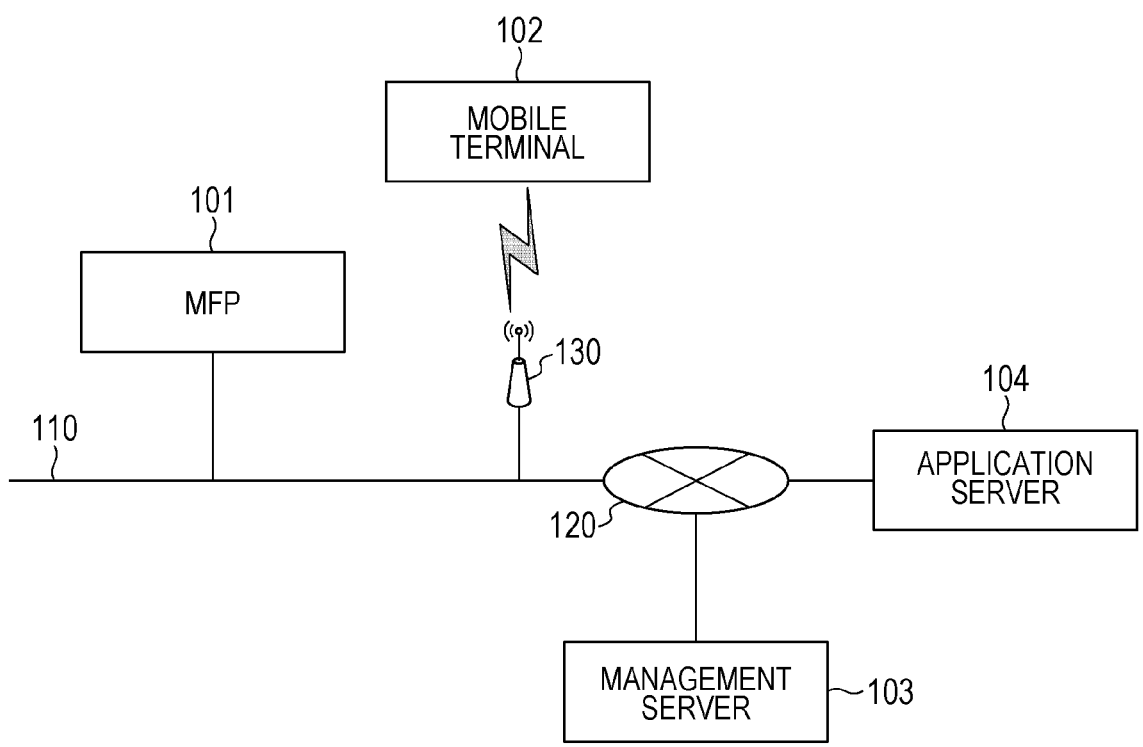
FIG. 1 is a diagram illustrating the system configuration of an information processing system according to an embodiment.

FIG. 1 is a diagram illustrating an example of the system configuration of an information processing system according to the present embodiment. The system includes a multi-function peripheral (MFP) 101, which is an example of an image processing apparatus connected to a local area network (LAN) 110, a mobile terminal 102 connected to the LAN 110 via a wireless access point (AP) 130, a management server 103 connected to a wide area network (WAN) 120, and an application server 104. The apparatus on the LAN 110 and the apparatus on the WAN 120 are connected to each other via their respective networks. FIG. 1 illustrates a typical network configuration example. The apparatuses may be connected to either the LAN 110 or the WAN 120.

The MFP 101 is an image processing apparatus including a scanner and a printer. Although the present embodiment will be described using an MFP as an example of the image processing apparatus, this is given for mere illustrative purposes. The image processing apparatus can be a single-function apparatus. The MFP 101 has an application platform for adding and executing applications operating on the apparatus (hereinafter referred to as "MFP applications"). The MFP 101 further includes a Web browser as one of the MFP applications. Although only one MFP is illustrated, a plurality of MFPs can be provided in the system. The mobile terminal 102 is a mobile information processing apparatus, typically, a smartphone or a tablet terminal. The mobile terminal 102 has an application platform for adding and executing applications (hereinafter referred to as mobile applications) operating on the information processing apparatus. The MFP 101 and the mobile terminal 102 can directly communicate with each other by short-range wireless communications, such as near field communication (NFC) and Bluetooth (Registered Trademark) (not illustrated). The management server 103 is a server for managing the MFP 101 and stores, for example, information for displaying a menu screen on the operating unit of the MFP 101. The application server 104 is a server for providing Web applications. The Web applications to be provided are programs operating on the application server 104. The Web applications provide an operating screen for the Web applications to the MFP 101 or the mobile terminal 102, and the MFP 101 or the mobile terminal 102 displays the operating screen on a Web browser. The MFP 101 or the mobile terminal 102 displays the operating screen for the Web application by accessing the application server 104, receives a user's operation on the operating screen, and returns the details of the received operation to the application server 104. In the present embodiment, the management server 103 creates a button according to the application operating on the mobile terminal 102 and displays the button on the MFP 101. The number of application servers is not limited to one. The system may include a plurality of servers depending on the purpose.

Figure 2:
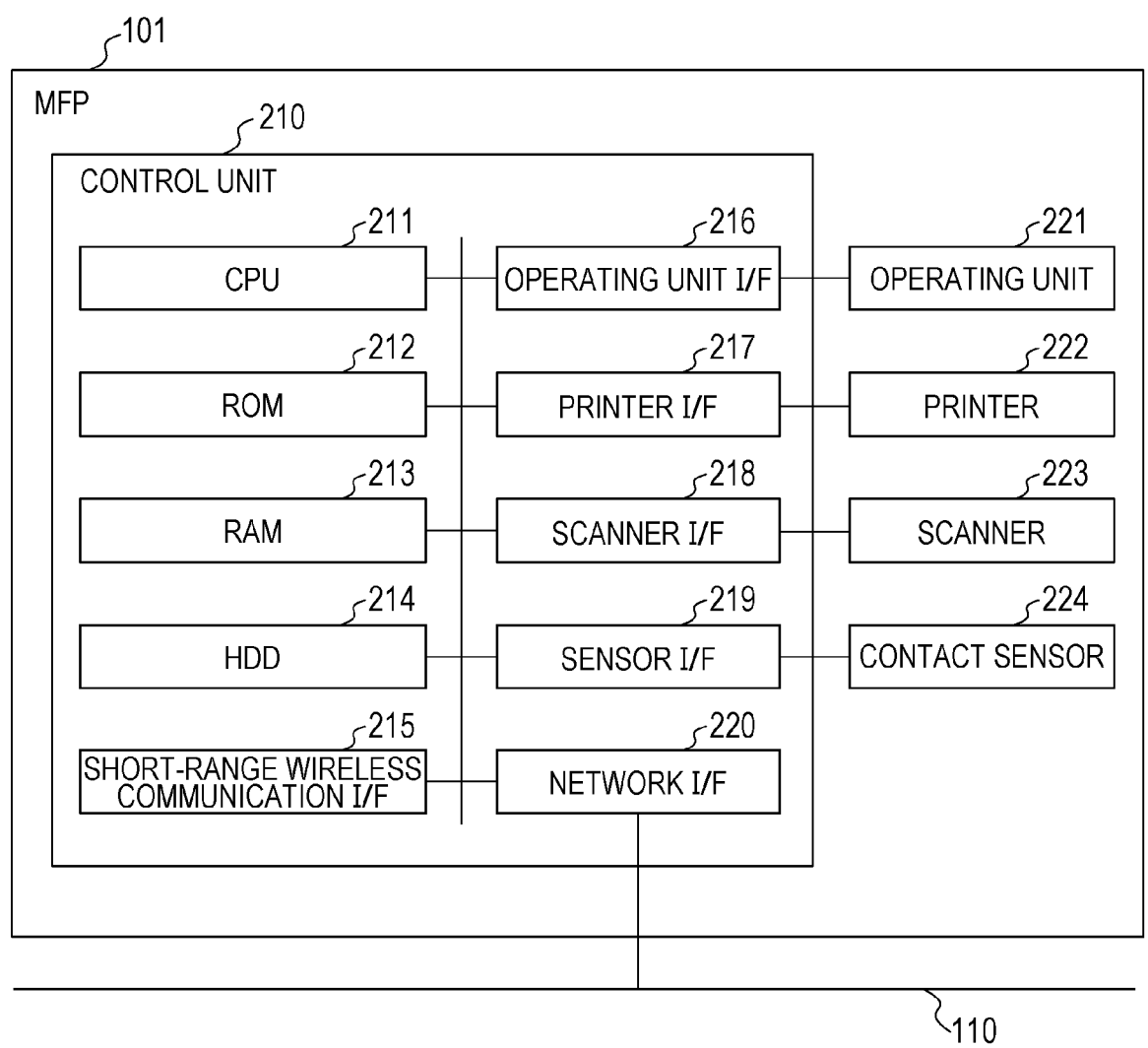
FIG. 2 is a block diagram illustrating the hardware configuration of an MFP according to an embodiment.

FIG. 2 is a block diagram illustrating the hardware configuration of the MFP 101. A control unit 210 including a central processing unit (CPU) 211 controls the overall operation of the MFP 101. The CPU 211 reads control programs stored in a read only memory (ROM) 212 and a hard disk drive (HDD) 214 and executes various control processes including read control and transmission control. A random access memory (RAM) 213 is used as a temporary storage area, such as a main memory and a work area for the CPU 211. The HDD 214 stores image data and various programs including installed MFP applications. A short-range wireless communication interface (I/F) 215 is an interface for short-range wireless communications, such as NFC and Bluetooth, and communicates with the mobile terminal 102 and so on to exchange data.

An operating unit I/F 216 connects an operating unit 221 and the control unit 210. The operating unit 221 includes a liquid-crystal display having a touch panel function and a keyboard. A printer I/F 217 connects a printer 222 and the control unit 210. Image data to be printed by the printer 222 is transferred from the control unit 210 to the printer 222 via the printer I/F 217 and is printed on a recording medium by the printer 222. A scanner I/F 218 connects a scanner 223 and the control unit 210. The scanner 223 scans an image on an original to generate image data and inputs the image data to the control unit 210 via the scanner I/F 218. A sensor I/F 219 connects a contact sensor 224 and the control unit 210. The contact sensor 224 is a sensor for detecting whether the mobile terminal 102 has come into contact with a predetermined position of the MFP 101. In the present embodiment, a mobile mount (not illustrated) on which a mobile terminal is to be placed is prepared on the MFP 101, and the contact sensor 224 detects that a mobile terminal is placed there. A network I/F 220 connects the control unit 210 (MFP 101) to the LAN 110. The network I/F 220 transmits and receives various information to and from another apparatus on the LAN 110 or the WAN 120.

Figure 3:
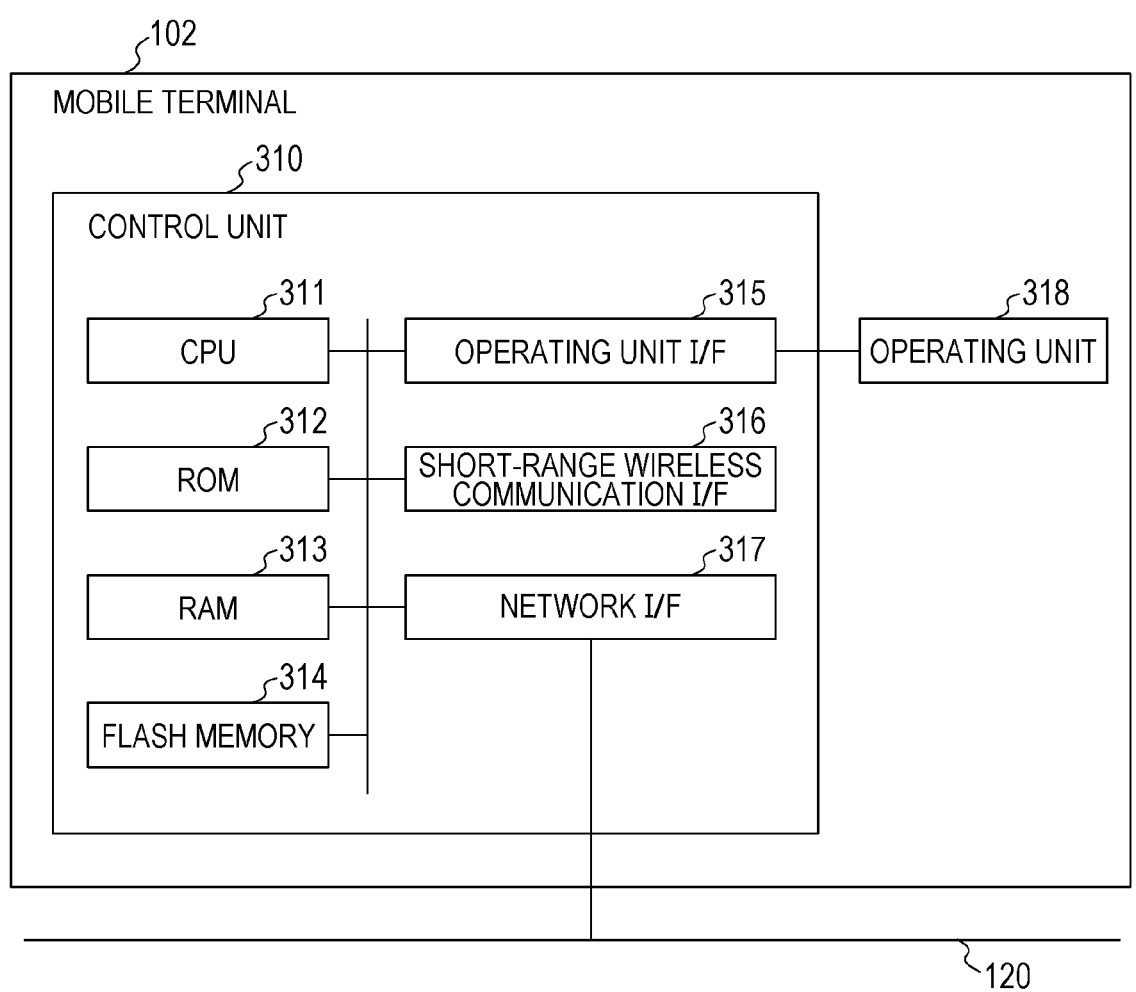
FIG. 3 is a block diagram illustrating the hardware configuration of a mobile terminal according to an embodiment.

FIG. 3 is a block diagram illustrating the hardware configuration of the mobile terminal 102. A control unit 310 including a CPU 311 controls the overall operation of the apparatus. The CPU 311 reads control programs stored in a ROM 312 and a flash memory 314 and executes various control processes. A RAM 313 is used as a temporary storage area, such as a main memory and a work area for the CPU 311. The flash memory 314 stores various programs and data.

An operating unit I/F 315 connects an operating unit 318 and the control unit 310. The operating unit 318 includes a liquid-crystal display having a touch panel function. A short-range wireless communication I/F 316 is an interface for short-range wireless communications, such as NFC and Bluetooth, and communicates with the MFP 101 and so on to exchange data. A network I/F 317 connects the control unit 310 to the WAN 120 or the LAN 110. The network I/F 317 is capable of wireless communication and transmits and receives various information to and from another apparatus on the WAN 120 or the LAN 110.

Figure 4:
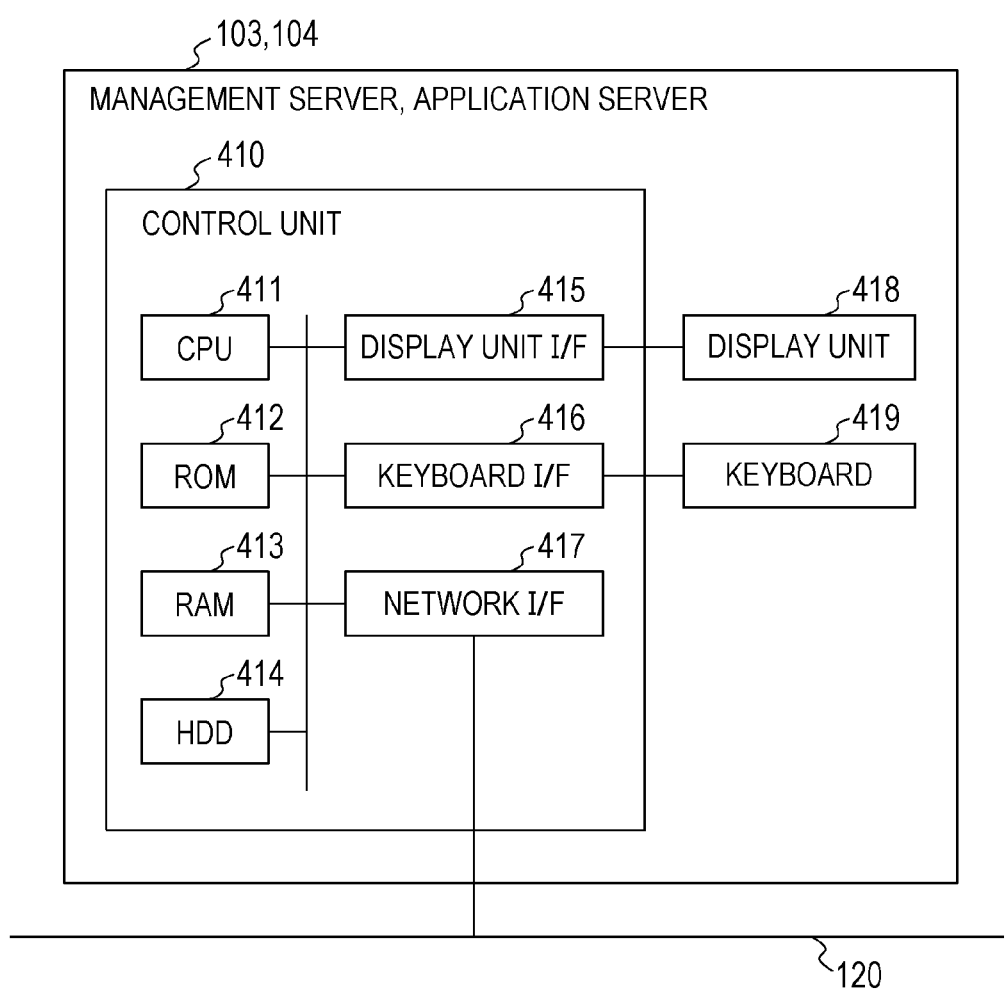
FIG. 4 is a block diagram illustrating the hardware configuration of a management server according to an embodiment.

FIG. 4 is a block diagram illustrating the hardware configuration of the management server 103 and the application server 104. A control unit 410 including a CPU 411 controls the overall operation of the apparatus. The CPU 411 reads control programs stored in a ROM 412 and an HDD 414 and executes various control processes. A RAM 413 is used as a temporary storage area, such as a main memory and a work area for the CPU 411. The HDD 414 stores various programs and data.

A display unit I/F 415 connects a display unit 418 and the control unit 410. A keyboard I/F 416 connects a keyboard 419 and the control unit 410. The CPU 411 recognizes an instruction from the user via the keyboard 419 and shifts a screen displayed on the display unit 418 according to the recognized instruction. A network I/F 417 connects the control unit 410 to the WAN 120 or the LAN 110. The network I/F 417 transmits and receives various information to and from another apparatus on the WAN 120 or the LAN 110.

Figure 5:
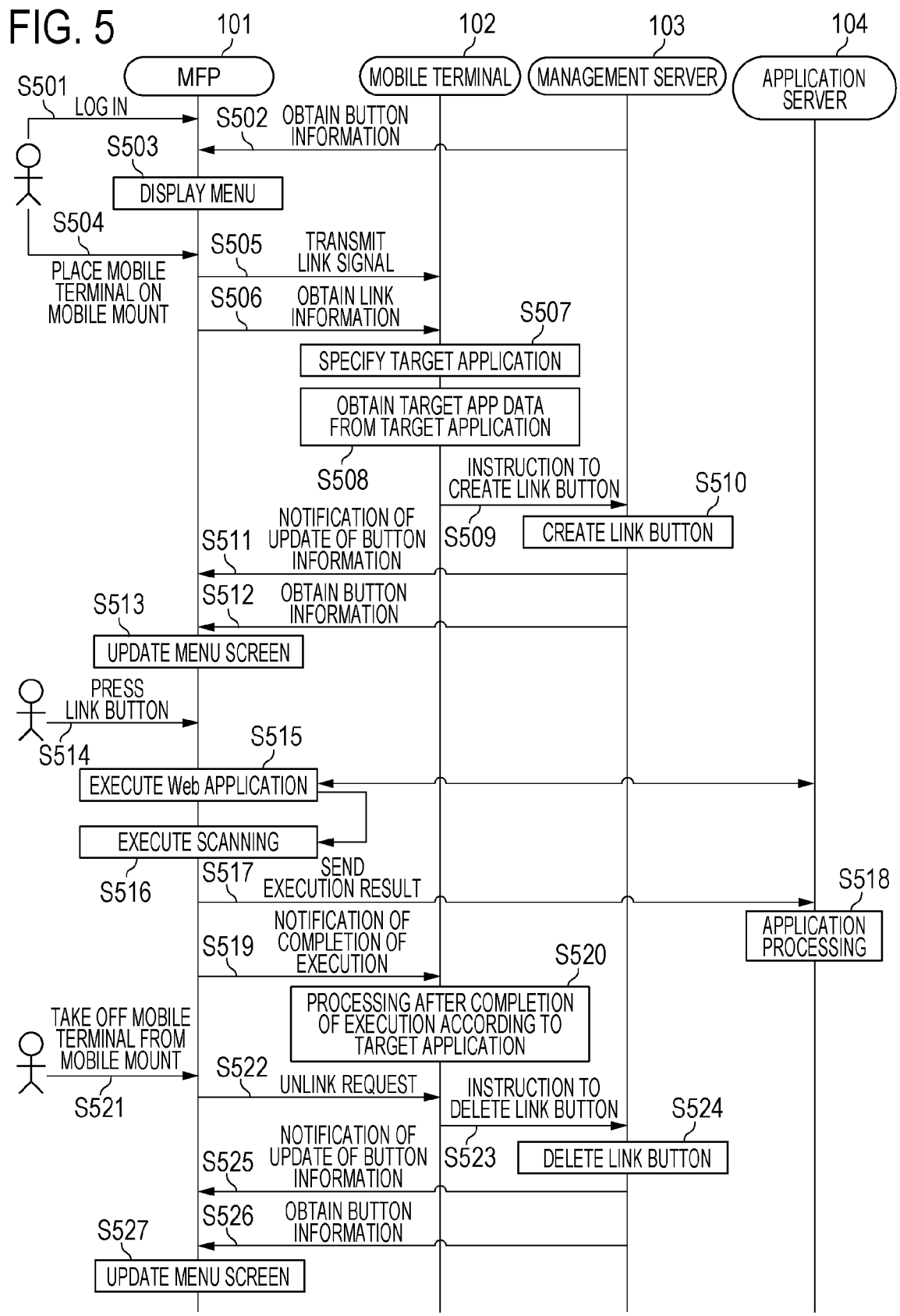
FIG. 5 is a sequence chart illustrating a series of processes performed by the information processing system according to an embodiment.

The present embodiment will be described in outline before the sequence chart of FIG. 5 is described. This is an example in which a button corresponding to a mobile application for managing a cloud storage (here, a button for calling up a Web application for scanning for storing a scanned image in a cloud storage) is displayed on the MFP 101 when the mobile terminal 102 is placed on the mobile mount of the MFP 101 in a state in which the mobile application is opened or in the foreground. When the mobile terminal 102 is placed on the mobile mount of the MFP 101, the mobile terminal 102 and the MFP 101 starts to exchange data, and an instruction to create a button corresponding to the application, which is displayed on or in the foreground of the mobile terminal 102, (a button for calling up a Web application for scanning) is transmitted from the mobile terminal 102 to the management server 103. The management server that has received the instruction creates the button, and the MFP 101 displays the button created by the management server 103 on the display. When the user presses the button displayed on the MFP 101, the MFP 101 calls up the Web application for scanning. When the link between the mobile terminal 102 and the MFP 101 is released, the created button is deleted from the MFP 101 and the management server 103.

FIG. 5 is a sequence chart illustrating a series of processes performed by the MFP 101, the mobile terminal 102, the management server 103, and the application server 104 of the present embodiment in cooperation. These processes are implemented by the CPU reading programs stored in the ROM, HDD, and the flash memory of each apparatus into the RAM for execution.

First, in step S501, the MFP 101 receives a login instruction from the user and performs login processing. In step S502, the MFP 101 obtains, from the management server 103, screen information including information on buttons (hereinafter referred to as "app buttons") (for example, information on applications that are opened when the buttons are pressed) to be displayed on the menu screen. The app buttons are buttons for calling up various functions, such as MFP applications and Web applications. In step S503, the MFP 101 displays a menu screen on the operating unit 221 on the basis of the button information obtained from the management server 103. When the user places the mobile terminal 102 on the mobile mount of the MFP 101, then in step S504 the MFP 101 detects with the contact sensor 224 that the mobile terminal 102 has been placed. In step S505, the MFP 101 transmits a beacon signal (hereinafter referred to as "link signal") for establishing communication with the mobile terminal 102 using the short-range wireless communication I/F 215. Here, Bluetooth is used as an example of short-range wireless communications.

In step S506, the mobile terminal 102 receives the link signal generated by the MFP 101 via the short-range wireless communication I/F 316. If the intensity of the received beacon signal is equal to or greater than a predetermined value, the mobile terminal 102 determines that the mobile terminal 102 is placed on the mobile mount of the MFP 101 and establishes communication with the MFP 101 to obtain link information. The link information includes information necessary for the mobile terminal 102 to perform the subsequent processing. Examples include user information on the user who logs in the MFP 101 (user ID), the IP address of the management server 103, and identification information on the MFP 101. In step S507, the mobile terminal 102 identifies a mobile application displayed on the screen of the operating unit 318 or in the foreground. In the subsequent processing, an app button corresponding to the mobile application is displayed on the MFP 101 (hereinafter, this application is referred to as "target application"). In step S508, the mobile terminal 102 obtains data necessary for the MFP 101 to display a button corresponding to the target application (hereinafter referred to as "target app data") from the target application. The target app data is data in which the target application is open or to be processed and differs according to the target application. For example, if the target application is a mobile application for managing a cloud storage, the target app data is an identifier indicating a folder that is displayed at present, and if the target application is a document creation application, the target app data is print data for printing a document that is created at present. The number of target app data is not limited to one but may be two or more. For example, for the document creation application, the target app data may include the file name of the document to be printed in addition to the print data.

In step S509, the mobile terminal 102 transmits the identifier of the target application, the target app data, and the link information to the management server 103 and instructs the management server 103 to create a button corresponding to the target application (hereinafter referred to as "link button"). In the present embodiment, the management server 103 with the IP address included in the link information obtained in step S506 is used as the destination. Alternatively, the IP address of the management server 103 may be set in the mobile terminal 102 as the destination.

In step S510, the management server 103 creates a link button using the identifier of the target application, the target app data, and the link information received from the mobile terminal 102. The link button is a kind of app button and is used to call up an MFP application and a Web application for performing processing corresponding to the target application from the menu screen of the MFP 101. The link button has a parameter for calling up an application for performing processing according to the target application (hereinafter referred to as "call parameter"). The call parameter is defined on the basis of the target app data and so on. In this sequence, the target application is a mobile application for managing a cloud storage, and the target app data is an identifier indicating the folder of the cloud storage. The call target of the link button is assumed to be a Web application for scanning that the application server 104 provides. In other words, if the target application is a mobile application for managing a cloud storage, it is expected that the data scanned with the MFP is transmitted to the storage. For that reason, the call target of the link button is assumed to be the Web application for scanning. The call target corresponding to the target application is determined in advance by the management server 103.

In step S511, the management server 103 that has received the link button creation instruction from the mobile terminal 102 notifies the MFP 101 that the button information has been updated.

In step S512, the MFP 101 that has received the button update notification obtains screen information including app button information from the management server 103. The obtained app button information includes information on the link button created by the management server 103 in step S510. In step S513, the MFP 101 updates the menu screen displayed on the operating unit 221 to the latest state on the basis of the screen information including the app button information obtained from the management server 103. The MFP 101 displays the link button that the management server 103 has created in step S510 as one of app buttons to be displayed on the menu screen. In this case, the MFP 101 obtains the screen information including app button information. Alternatively, the MFP 101 may obtain only the information on the link button created in step S510 and update the menu screen using the information.

Next, when the user presses the link button in step S514, the MFP 101 detects that the link button displayed on the menu screen has been pressed by the user. In step S515, the MFP 101 accesses the Web application for scanning, which is the call target of the link button, provided by the application server 104, using a Web browser. This sequence illustrates a configuration in which a link button is displayed on the MFP 101, and the user presses the link button to access the call target. This is given for mere illustrative purposes. Alternatively, upon acquisition of the link button information in step S512, the MFP 101 may automatically start the Web browser to access the call target.

The MFP 101 performs the processing of the Web application for scanning while communicating with the application server 104 a plurality of times as necessary. In step S516, the MFP 101 performs scanning according to an instruction from the Web application for scanning. In step S517, the MFP 101 sends the result of execution of the scanning and scanned image data to the application server 104.

In step S518, the application server 104 uploads the received image data to a cloud that the target application (the mobile application for managing the cloud storage) indicates. The destination of the upload is indicated by the identifier of the folder of the cloud storage indicated by the target app data.

In step S519, the MFP 101 notifies the mobile terminal 102 of completion of execution of the link button.

In step S520, the mobile terminal 102 that has received the notification from the MFP 101 performs predetermined processing after the target application (the mobile application for managing the cloud storage) completes execution of the link button. In this case, the mobile terminal 102 updates the view of the screen of the file list in the cloud storage to the latest state so that the image data uploaded in step S518 is reflected. The predetermined processing after completion of execution of the link button differs according to the target application. For example, if the target application is an address book application, when the link button is executed, the MFP 101 may transmit data to the destination displayed on the mobile terminal 102, and the fact that the data has been transmitted may be displayed on the mobile terminal 102 in the predetermined processing after completion of the execution.

Next in step S521, when the user puts the mobile terminal 102 out of the mobile mount of the MFP 101, the MFP 101 detects with the contact sensor 224 that the mobile terminal 102 is separated from the mobile mount. In step S522, the MFP 101 sends a request for unlinking to the mobile terminal 102. The unlinking is disconnection of the communication between the MFP 101 and the mobile terminal 102. There are multiple patterns of condition under which the MFP 101 sends a request for unlinking to the mobile terminal 102. One example of transmission timing is "when it is detected that the mobile terminal 102 is separated from the mobile mount". Other patterns include "when a user log-out is detected" and "when there is no user operation for a certain period of time". Upon receiving the request for unlinking, the mobile terminal 102 disconnects the communication with the MFP 101.

In step S523, the mobile terminal 102 that has received the unlink request instructs the management server 103 to delete the link button.

In step S524, the management server 103 that has received the delete instruction deletes the link button created in step S510. In step S525, the management server 103 notifies the MFP 101 that the button information has been updated.

In step S526, the MFP 101 that has received the button update notification obtains app button information from the management server 103. In step S527, the MFP 101 updates the menu screen displayed on the operating unit 221 to the latest state on the basis of the button information obtained from the management server 103. Since the button information obtained in step S526 does not include information on the link button, the link button disappears from the menu screen after the menu screen is updated to the latest state.

This sequence chart illustrates a configuration in which the link button is created when the mobile terminal 102 is placed on the mobile mount of the MFP 101. However, the mobile terminal 102 may not be placed on the mobile mount. Any other configuration may be employed in which the mobile terminal 102 and the MFP 101 can exchange data. For example, the subsequent processing may be advanced when the mobile terminal 102 and the MFP 101 establish the Bluetooth communication, or after the mobile terminal 102 and the MFP 101 exchange wireless LAN information by the established Bluetooth communication and establish wireless LAN communication using the information. In the case of NFC, the processing may be advanced after the mobile terminal 102 receives wireless LAN information from the MFP 101 using NFC and establishes wireless LAN communication with the MFP 101 using the wireless LAN formation.

According to the sequence chart of FIG. 5, upon establishing communication between the mobile terminal 102 and the MFP 101, processing corresponding to an application displayed on the screen of the mobile terminal 102 or in the foreground can be executed by the MFP 101.

Figure 6:
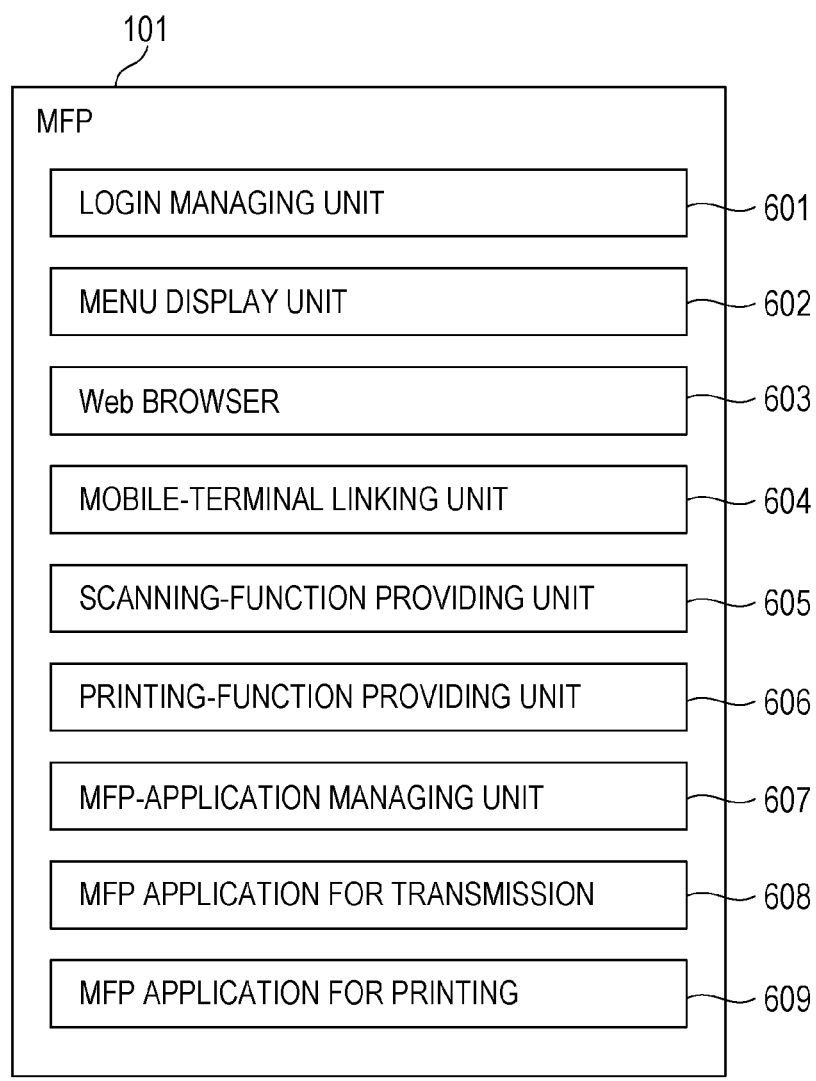
FIG. 6 is a block diagram illustrating the software configuration of the MFP according to an embodiment.

FIG. 6 is a block diagram illustrating the software configuration of the MFP 101 according to the present embodiment. This functional block is executed by the CPU 211 reading the programs stored in the ROM 212 and the HDD 214 of the MFP 101 into the RAM 213 and executing them.

A login managing unit 601 manages user authentication performed by the MFP 101. A menu display unit 602 displays a menu screen on the operating unit 221. The menu display unit 602 displays app buttons for calling up an MFP application and a Web application on the menu screen. The menu display unit 602 obtains information on the app buttons to be displayed from the management server 103.

A Web browser 603 accesses a Web server and displays Web content.

A mobile-terminal linking unit 604 performs processing for linking to the mobile terminal 102. For example, the mobile-terminal linking unit 604 detects that the mobile terminal 102 has been placed on the mobile mount using the contact sensor 224 or communicates with the mobile terminal 102 via the short-range wireless communication I/F 215.

A scanning-function providing unit 605 provides an MFP application and a Web application with a scanning function and an application programming interface (API) for calling the scanning function. A printing-function providing unit 606 provides an MFP application and a Web application with a printing function and an API for calling up the printing function.

An MFP-application managing unit 607 is a software platform for operating the MFP application on the MFP 101. FIG. 6 illustrates a state in which two MFP applications, an MFP application for transmission 608 and an MFP application for printing 609, are installed. The MFP application for transmission 608 is an MFP application for transmitting scanned image data to the outside via the LAN 110. The MFP application for printing 609 is an MFP application for printing print data received from the outside. The applications 608 and 609 are examples of the MFP application. Other MFP applications may be installed.

The MFP 101 may further have other functions (not illustrated).

Figure 7:
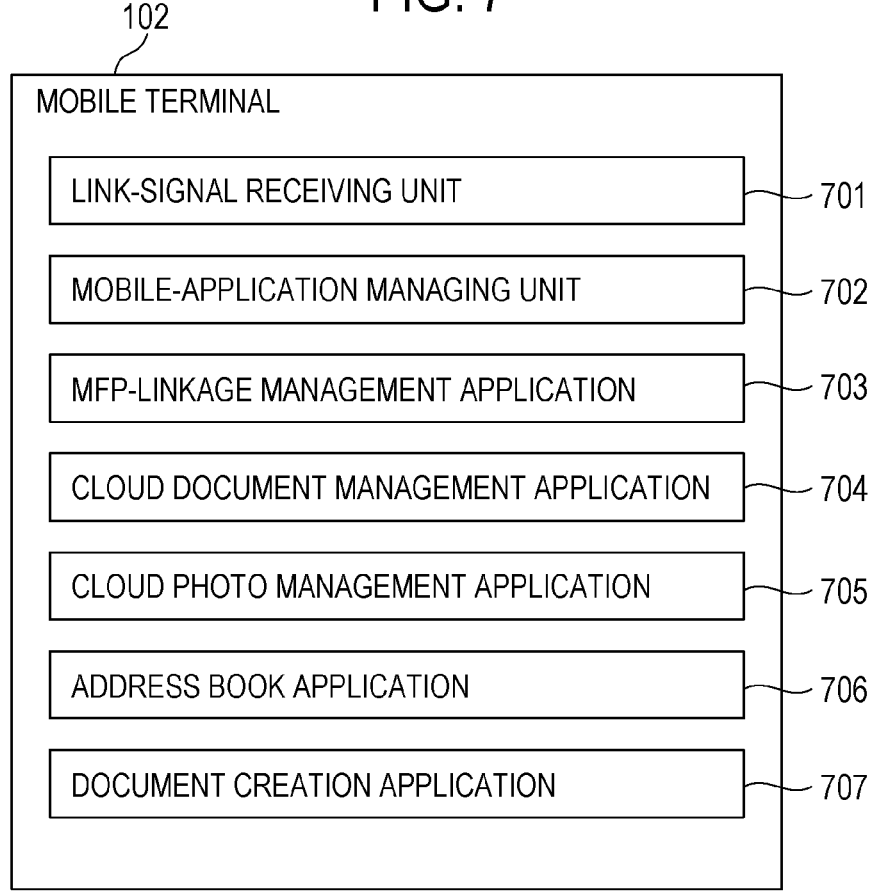
FIG. 7 is a diagram illustrating the software configuration of the mobile terminal according to an embodiment.

FIG. 7 is a diagram illustrating the software configuration of the mobile terminal 102 of the present embodiment. This functional block is executed by the CPU 311 reading the programs stored in the ROM 312 and the flash memory 314 of the mobile terminal 102 into the RAM 313 and executing them.

A link-signal receiving unit 701 receives a beacon signal (link signal) via the short-range wireless communication I/F 316 and calls up a mobile application corresponding to the link signal. In the present embodiment, the mobile application corresponding to the link signal transmitted from the MFP 101 is an MFP-linkage management application 703.

A mobile-application managing unit 702 is a software platform for operating mobile applications on the mobile terminal 102. FIG. 7 illustrates a state in which five mobile applications 703 to 707 are installed.

The MFP-linkage management application 703 performs processing for linking the MFP and the target application together. For example, the MFP-linkage management application 703 specifies a target application to be linked to the MFP or instructs the management server 103 to create a link button.

The cloud document management application 704 is a mobile application for operating a cloud storage service for managing document data from the mobile terminal 102. The cloud photo management application 705 is a mobile application for operating a cloud storage service for managing photo data from the mobile terminal 102. The address book application 706 is a mobile application for managing contact information, such as contact name, phone number, and email address. The document creation application 707 is a mobile application for creating document data. The applications 704 to 707 other than the MFP-linkage management application 703 are examples of mobile applications. The mobile terminal 102 may have other mobile applications installed.

The mobile terminal 102 may have other functions (not illustrated).

Figure 8:
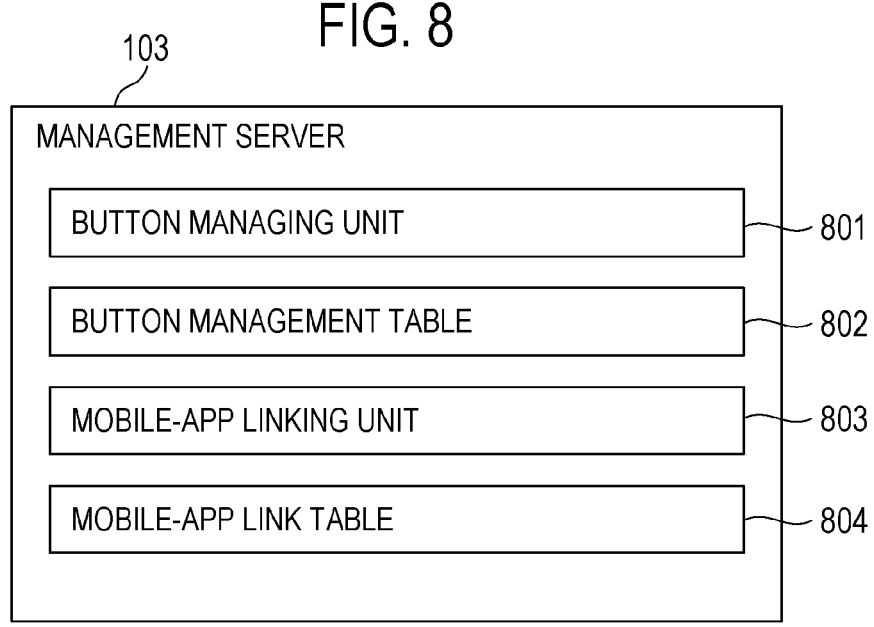
FIG. 8 is a diagram illustrating the software configuration of the management server according to an embodiment.

FIG. 8 is a diagram illustrating the software configuration of the management server 103 of the present embodiment. This functional block is executed by the CPU 411 reading the programs stored in the ROM 412 and the HDD 414 of the management server 103 into the RAM 413 and executing them.

A button managing unit 801 manages app buttons displayed on the menu screen of the MFP 101. For example, the button managing unit 801 notifies the MFP 101 of the update of the app buttons or transmits app button information to the MFP 101 in response to a request from the MFP 101. A button management table 802 is a table that manages, for example, information necessary for executing applications linked to the app buttons.

FIGS. 12A to 12C illustrate examples of the button management table 802 according to the embodiment. FIG. 12A illustrates an example of the button management table 802 in step S502 of the sequence chart of FIG. 5. FIGS. 12B and 12C illustrate examples of the link button created in step S510 of the sequence chart of FIG. 5.

The button management table 802 has eight columns 1201 to 1208.

Button ID 1201 defines an identifier for uniquely identifying each app button. The column of Button ID 1201 also serves as an identifier for uniquely specifying each row of the table. In the following description, the value in the column of Button ID 1201 is used to specify each row of the table. For example, the row whose value in the column of Button ID 1201 is "b001" is written as "row b001".

Button Type 1202 is a column that defines the type of each app button. Values that Button Type 1202 can take are three types, "Shared", "Personal", and "MobileLink". The value "Shared" indicates that the app button is an app button that any user can use (hereinafter referred to as "Shared button"). The value "Personal" indicates that the app button is an app button linked to a specific user (hereinafter referred to as "Personal button"). Shared button and Personal button are app buttons that can be added or deleted by the manager or the user of the MFP 101. The value "MobileLink" indicates that the app button is a link button. The link button is a button tied to a specific user, but unlike Personal button, it is a temporary button that is present only when the MFP 101 and the mobile terminal 102 are linked to each other, and is therefore distinguished from Personal button.

Button Name 1203 is a column that defines the name of each app button. Target Type 1204 is a column that defines the type of the target application called by each app button. Values that Target Type 1204 can take are two types, "MFP" and "Web". "MFP" indicates that the call target of each app button is an MFP application. "Web" indicates that the call target of each app button is a Web application.

Button Target 1205 is a column that defines the call target of each app button. In the case where Target Type 1204 is "MFP", Button Target 1205 defines the executable file of each MFP application. If Target Type 1204 is "Web", Button Target 1205 defines the uniform resource location (URL) of each Web application. Button Parameter 1206 defines a parameter to be given in calling up an application defined by Button Target 1205. For example, for "Send mail to client" button, a parameter, such as the mail address of the destination, is given.

View Order 1207 defines the view order of each app button on the menu screen of the MFP 101. The view order is in an ascending order. In FIGS. 12B and 12C, the records of the link buttons created by linking to the mobile terminal 102 take a value of −1 so that the app buttons are displayed first.

User ID 1208 defines the owner user of each app button. For Shared button, there is no owner user, and therefore, User ID 1208 is blank.

Referring back to FIG. 8, a mobile-app linking unit 803 links to the mobile applications of the mobile terminal 102. For example, the mobile-app linking unit 803 creates or deletes a link button according to an instruction from the mobile terminal 102. A mobile-app link table 804 is a table that manages information for creating a link button according to the target application. If the target application is a mobile application for managing a cloud storage, data scanned with the MFP 101 is expected to be transmitted to the storage. Therefore, the table is used, for example, to associate the call target of the link button with a Web application for scanning in advance.

FIG. 13 illustrates an example of the mobile-app link table 804 according to the embodiment. The mobile-app link table 804 has eight columns 1301 to 1308.

ID 1301 is an identifier for uniquely identifying each row of the table. In the following description, the value in the column of the ID 1301 is used to specify each row of the table. For example, the row whose value of ID 1301 is "m001" is written as "row m001".

Mobile App ID 1302 defines the identifier of each mobile application. Button Name 1303 defines the name of a link button created. Button Name 1303 can define a variable. In this case, the variable is a character string bracketed by symbol "%". The variable is replaced with a character string corresponding to the variable when the link button is created. For example, in Button Name 1303 in row m003, a variable "% email %" is defined. This variable is replaced with an email address included in target app data obtained from the target application when the link button is created.

Target Type 1304 is a column that defines the type of the call target application of each app button. Button Target 1305 is a column that defines the call target of each app button. An example of the call target is a predetermined application that may be used by the user as the target application. Button Parameter 1306 defines a parameter to be given in calling up an application defined by Button Target 1305. For example, if the call target is execution of printing as in row m004, a parameter for print setting is applicable.

Mobile Param Name 1307 is a parameter given before column 1308 of a parameter given in calling an application defined in Button Target 1305. Mobile Param Key 1308 defines a key for extracting a value corresponding to the parameter defined in Mobile Param Name 1307 from target app data obtained from the target application. The parameter defined in column 1308 changes dynamically according to the app data. In an example, in the case of "scan and store in WebDrive" in row m001, the parameter indicates that the destination ("destination" in column 1307) is a current path that the target app data indicates ("current path" in column 1308). Thus, when the mobile terminal 102 displays a WebDrive application at present, column 1308 defines a key for extracting an identifier indicating the folder of Web-Drive. FIG. 13 illustrates an example in which one parameter changes in value according to the target application. Alternatively, two or more parameters may change in value according to the target application. In this case, a plurality of columns similar to Mobile Param Name 1307 and Mobile Param Key 1308 may be prepared, or another table may be prepared.

FIGS. 9A to 9E are flowcharts for illustrating processing performed by the MFP 101 in the present embodiment. The steps of the flowcharts of FIGS. 9A to 9E are executed by the CPU 211 reading the programs stored in the ROM 212 and the HDD 214 of the MFP 101 into the RAM 213 and executing them. Although the present embodiment is an example in which Bluetooth Low Energy (BLE) is used as short-range wireless communication, another short-range wireless communication, such as NFC, may be used. In the present embodiment, the MFP 101 operates as a peripheral terminal, and the mobile terminal 102 operates as a central terminal in the short-range wireless communication of BLE.

FIG. 9A is a flowchart for illustrating processing of the MFP 101 from login processing to displaying a menu screen. The flowchart in FIG. 9A corresponds to the processing of MFP 101 from steps S501 to S503 of the sequence chart of FIG. 5.

In step S901, the login managing unit 601 that has received a login instruction from the user performs user authentication. A method of authentication may be authentication using an integrated circuit (IC) card or authentication performed by the user inputting the user name and password on the MFP 101. The user authentication is not necessarily needed. If the MFP 101 is configured not to require user authentication, the processing may be started from step S903 without the need for logging-in. In this case, if an identifier for specifying the user is needed in the subsequent processing, a predetermined identifier (for example, "GUEST") may be used.

If in step S902 user authentication has succeeded, the login managing unit 601 proceeds to step S903, and if user authentication has failed, the login managing unit 601 displays an error in step S910 and terminates the processing.

In step S903, the menu display unit 602 transmits a request to obtain app button information to the button managing unit 801 of the management server 103. At that time, the user ID of the user authenticated in step S901 is included in the request so that the menu display unit 602 obtains information on only the app button corresponding to the login user.

In step S904, the menu display unit 602 receives information on the app button from the button managing unit 801 of the management server 103 as a response to the acquisition request. The app button information received here is information managed on the button management table 802 by the button managing unit 801. For example, if the user ID of the login user is "u001", the app button information received is information on six app buttons, five Shared buttons defined in rows b001 to b005 and one Personal button defined in row b101 in which the user ID is u001.

In step S905, the menu display unit 602 displays a menu screen on the operating unit 221 on the basis of the received app button information.

Figure 14A:
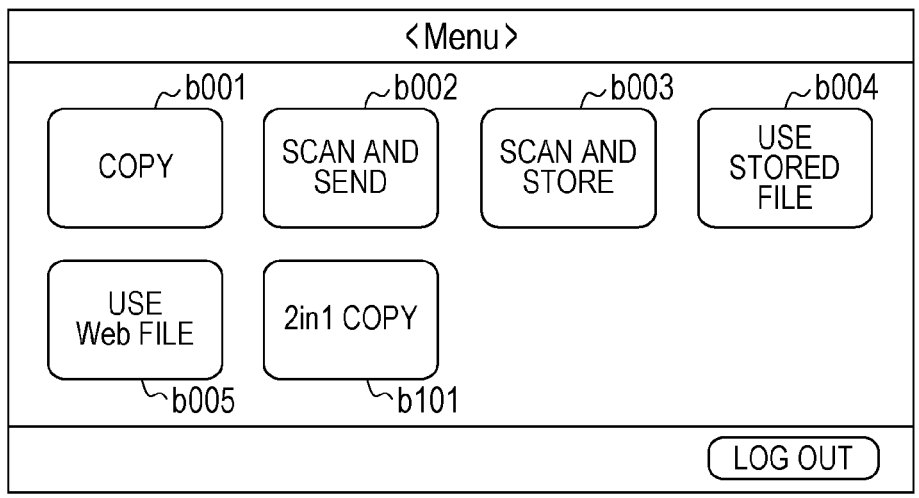
FIG. 14A illustrates an example of a menu screen displayed on the operating unit of the MFP according to an embodiment.
Figure 14B:
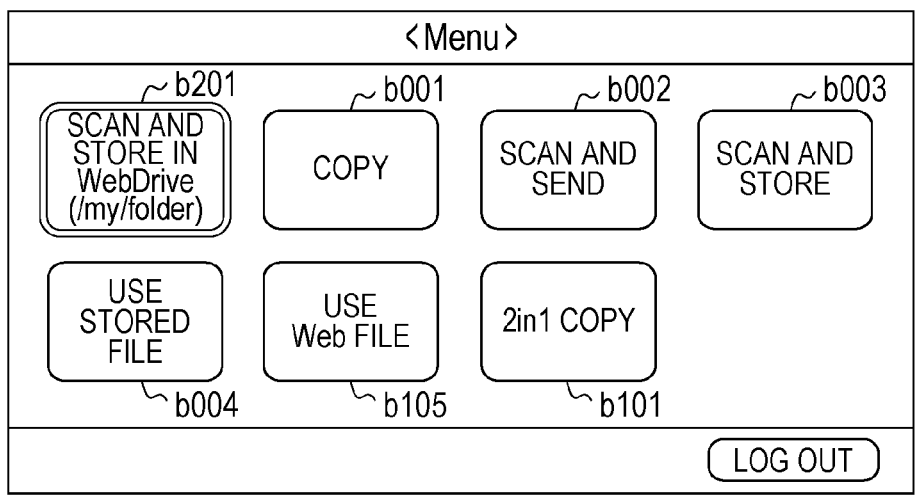
FIG. 14B illustrates an example of a menu screen displayed on the operating unit of the MFP according to an embodiment.
Figure 14C:
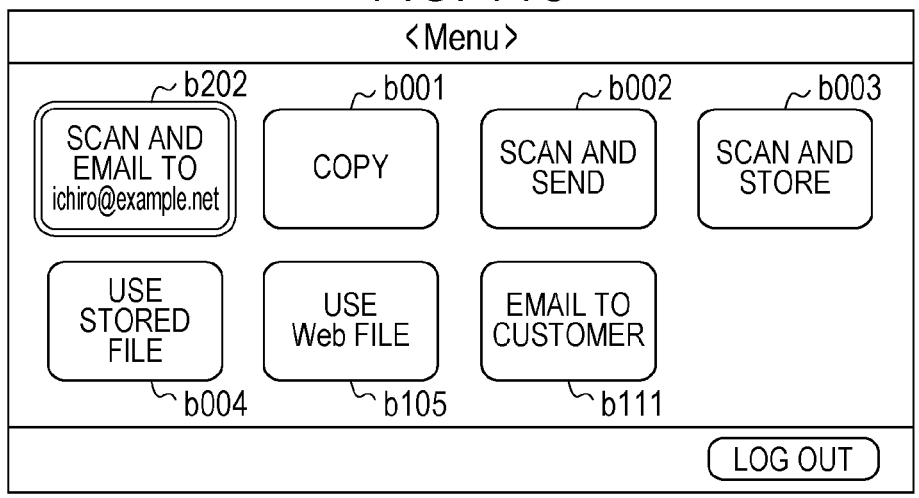
FIG. 14C illustrates an example of a menu screen displayed on the operating unit of the MFP according to an embodiment.

FIGS. 14A to 14C illustrate examples of the menu screen. FIG. 14A illustrates an example of the menu screen displayed in step S905 in the case where the user ID of the user who logs in the MFP 101 is "u001". The menu screen displays six app buttons, the five Shared buttons defined in rows b001 to b005 and one Personal button defined in row b101, in the order defined in column View Order 1207. FIGS. 14B and 14C illustrate examples of the menu screen after a link button is created, which will be described later with reference to the flowchart of FIG. 9C.

Referring back to FIG. 9A, in step S906, the menu display unit 602 establishes connection of WebSocket so as to receive a notification that the app button information has been updated from the management server 103, and the processing ends. The notification using WebSocket is an example of a means for detecting the update of the app button information. Alternatively, another means, such as a polling method in which the menu display unit 602 periodically sends inquiries to the management server 103, may be used. The management server 103 may obtain identification information on the MFP to which the management server 103 gives the notification from the mobile terminal 102 to identify the MFP.

Figure 9B:
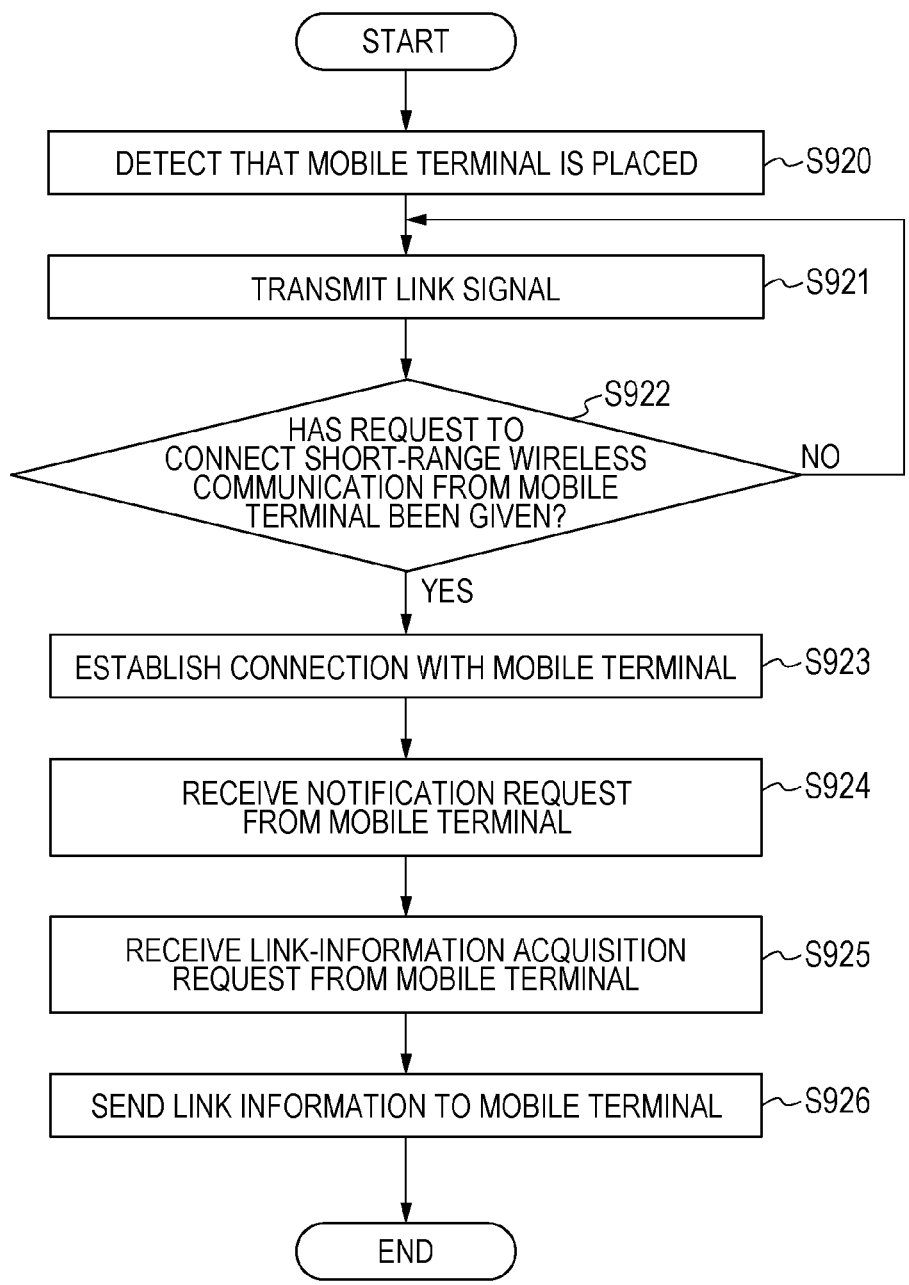
FIG. 9B is a flowchart illustrating processing of the MFP according to an embodiment.

FIG. 9B is a flowchart for illustrating processing in which the MFP 101 detects that the mobile terminal 102 has been placed on the mobile mount and links to the mobile terminal 102. The flowchart of FIG. 9B corresponds to the processing performed by the MFP 101 in steps S504 to S506 of the sequence chart of FIG. 5.

In step S920, the mobile-terminal linking unit 604 detects with the contact sensor 224 that the mobile terminal 102 has been placed on the mobile mount.

In step S921, the mobile-terminal linking unit 604 transmits a BLE advertising packet, which is a link signal for linking to the mobile terminal 102, via the short-range wireless communication I/F 215. In step S922, the mobile-terminal linking unit 604 waits for a request to connect short-range wireless communication from the mobile terminal 102. If a connect request from the mobile terminal 102 has not been given, the mobile-terminal linking unit 604 returns to step S921 and transmits a link signal again. If a request for connection has been given from the mobile terminal 102, the mobile-terminal linking unit 604 advances the processing to step S923.

In step S923, the mobile-terminal linking unit 604 establishes connection with the mobile terminal 102 in response to the connection request from the mobile terminal 102. Note that the communication between the MFP 101 and the mobile terminal 102 is hereinafter performed using short-range wireless communication unless otherwise specified.

In step S924, after the linking, the mobile-terminal linking unit 604 receives, from the mobile terminal 102, an instruction (a notification request) to give a notification necessary for the processing of the present embodiment to the mobile terminal 102. In the present embodiment, the notification necessary for the processing of the present embodiment includes two, "completion of execution of link button" and "request for unlinking".

In step S925, the mobile-terminal linking unit 604 receives a request for obtaining link information from the mobile terminal 102. The link information is information necessary for the mobile terminal 102 to link to the MFP 101, for example, the user ID of the user who logs in the MFP 101, the IP address of the management server 103, and the identifier of the MFP 101. In step S926, the mobile-terminal linking unit 604 sends the link information to the mobile terminal 102 as a response to the processing in step S925 and terminates the processing.

Figure 9C:
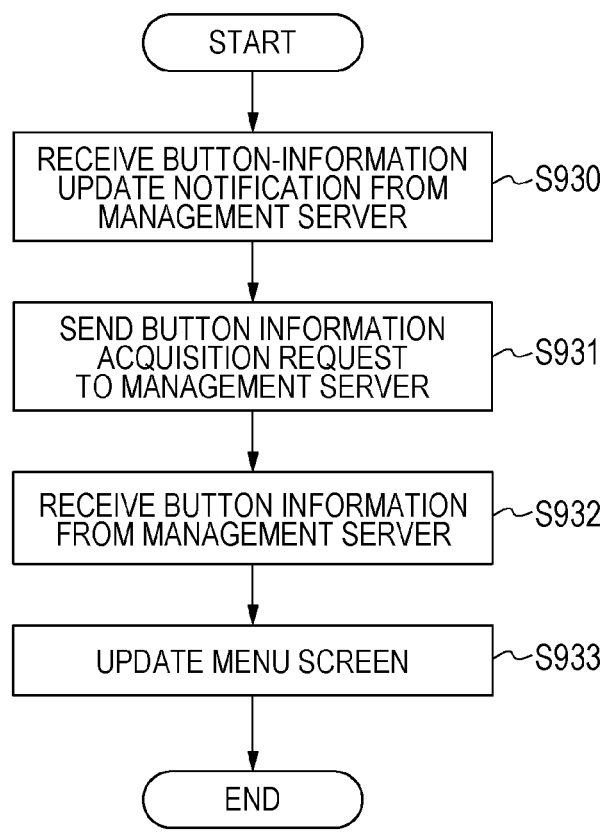
FIG. 9C is a flowchart illustrating processing of the MFP according to an embodiment.

FIG. 9C is a flowchart for illustrating processing in which the MFP 101 updates the menu screen in response to a button information update notification from the management server 103. The flowchart in FIG. 9C corresponds to processing of the MFP 101 in steps S511 to S513 and steps S525 to S527 of the sequence chart of FIG. 5.

In step S930, the menu display unit 602 receives a notification that the button information has been updated from the management server 103. In step S931, the menu display unit 602 transmits an app-button information acquisition request to the button managing unit 801 of the management server 103. In step S932, the menu display unit 602 receives app button information from the button managing unit 801 of the management server 103 in response to the acquisition request. In step S933, the menu display unit 602 displays a menu screen on the operating unit 221 on the basis of the received app button information and terminates the processing.

FIGS. 14B and 14C are examples of the menu screen after a link button is created (step S513 of the sequence chart of FIG. 5). FIG. 14B illustrates an example of user "u001", in which the link button defined in row b201 of FIG. 12B is displayed in addition to the app buttons displayed in FIG. 14A. FIG. 14C illustrates an example of user "u002", in which the link button defined in row b202, Shared buttons defined in rows b001 to b005, and Personal button defined in row b11 are displayed.

The link buttons are displayed at the top according to View Order 1207. As illustrated in FIGS. 14B and 14C, the link buttons may be displayed in a manner different from Personal buttons and Shared buttons other than the link buttons so that it can be seen that the link buttons are newly created app buttons.

FIG. 9D is a flowchart for illustrating the app button execution processing of the MFP 101. The flowchart of FIG. 9D corresponds to the processing of MFP 101 in steps S514 to S519 of the sequence chart of FIG. 5.

In step S940, the menu display unit 602 detects that the user has pressed an app button. In step S941, the menu display unit 602 checks Target Type information on the app button pressed by the user. If Target Type is Web, the menu display unit 602 advances the processing to step S942, and if Target Type is MFP, the menu display unit 602 advances the processing to step S946.

In step S942, the menu display unit 602 calls up the Web browser 603 to access a Web application. The access target is a uniform resource locator (URL) in which Button Parameter 1206 is added as a query to the URL defined in Button Target 1205. In one example, the Web application called up here is a Web application for scanning provided by the application server 104. Scanning is illustrative only. A Web application having another function, such as printing or fax, may be called up.

In step S943, the Web browser 603 receives a user operation via the operating unit 221 and advances processing of the Web application while communicating with the application server 104 a plurality of times as necessary. In step S944, the scanning-function providing unit 605 performs scanning according to a call instruction from the Web application. In step S945, the scanning-function providing unit 605 sends the scan execution result and scanned image data to the application server 104 and advances the processing to step S950.

In step S946 subsequent to step S941, the menu display unit 602 calls up an MFP application corresponding to the app button pressed by the user. Specifically, the menu display unit 602 calls up the execution file defined in column Button Target 1205 to which the parameter in column Button Parameter 1206 is added. In one example, the following description will be given assuming that the MFP application called up here is the MFP application for printing 609. The printing is given for illustration only. An MFP application having another function, such as scanning or fax, may be called up.

In step S947, the MFP application for printing 609 receives a user operation via the operating unit 221 and performs processing of the application, for example, displaying a setting screen and displaying a document preview as necessary. In step S948, the MFP application for printing 609 executes printing using the printing-function providing unit 606 and advances the processing to step S950.

In step S950, the menu display unit 602 checks the Button Type of the executed app button to determine whether the executed app button is a link button. If the executed app button is a link button, the menu display unit 602 advances the processing to step S951, and if not, terminates the processing.

In step S951, the mobile-terminal linking unit 604 determines whether the notification request has been received in step S924 from the mobile terminal 102. If the notification request has been received, the mobile-terminal linking unit 604 advances the processing to step S952, and if not, terminates the processing. In step S952, the mobile-terminal linking unit 604 notifies the mobile terminal 102 that execution of the link button has been completed and terminates the processing.

Figure 9E:
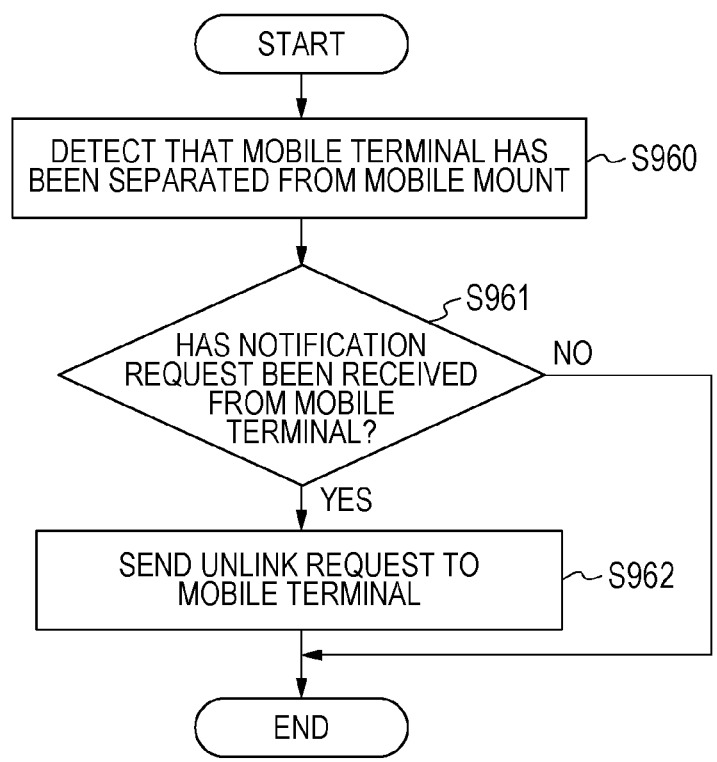
FIG. 9E is a flowchart illustrating processing of the MFP according to an embodiment.

FIG. 9E is a flowchart for illustrating processing in which the MFP 101 detects that the mobile terminal 102 has been separated from the mobile mount and notifies the mobile terminal 102 of the separation. The flowchart in FIG. 9E corresponds to the processing of the MFP 101 in steps S521 to S522 of the sequence chart of FIG. 5.

In step S960, the mobile-terminal linking unit 604 detects with the contact sensor 224 that the mobile terminal 102 has been separated from the mobile mount. In step S961, the mobile-terminal linking unit 604 determines whether the notification request has been received in step S924 from the mobile terminal 102. If the notification request has been received, the mobile-terminal linking unit 604 advances the processing to step S962, and if not, terminates the processing. In step S962, the mobile-terminal linking unit 604 gives an unlink request to the mobile terminal 102 and terminates the processing.

Although FIG. 9E illustrates an example in which the timing when an unlink request is given to the mobile terminal 102 is "the time when the mobile terminal 102 is separated from the mobile mount", the same processing is performed at another timing when an unlink request is given.

For example, instead of "when the mobile terminal 102 is separated from the mobile mount", "when user logout is detected" in step S960, the subsequent processing is performed. Likewise, instead of "when the mobile terminal 102 is separated from the mobile mount", "when a user operation has not been performed for a predetermined time" in step S960, the subsequent processing is performed.

The advantageous effect of the processing of the flowcharts of FIGS. 9A to 9E is that, after the MFP 101 links to the mobile terminal 102, the MFP 101 obtains link button information from the management server 103 and displays a link button, so that the MFP 101 can give instructions to execute and delete the link button.

FIGS. 10A to 10C are flowcharts for illustrating the processing performed by the mobile terminal 102 of the present embodiment. The steps of the flowcharts of FIGS. 10A to 10C are executed by the CPU 311 reading the programs stored in the ROM 312 and the flash memory 314 of the mobile terminal 102 into the RAM 313 and executing them.

FIG. 10A is a flowchart illustrating processing from the mobile terminal 102 receiving a link signal from the MFP 101 to instructing the management server 103 to create a link button. The flowchart of FIG. 10A corresponds to the processing of the mobile terminal 102 in steps S505 to S509 of the sequence chart of FIG. 5.

In step S1001, the link-signal receiving unit 701 receives a BLE advertising packet via the short-range wireless communication I/F 316. In step S1002, the link-signal receiving unit 701 checks a universally unique identifier (UUID) included in the received advertising packet to determine whether the signal is a link signal generated from the MFP 101. If the received signal is a link signal, the link-signal receiving unit 701 advances the processing to step S1003, and if not, terminates the processing.

In step S1003, the link-signal receiving unit 701 calls up the MFP-linkage management application 703 in the background so that no screen shift occurs on the operating unit 318.

In step S1004, if the radio field intensity of the received advertising packet is equal to or greater than a predetermined value, it is determined that the mobile terminal 102 is placed on the mobile mount of the MFP 101, and the MFP-linkage management application 703 requests the MFP 101 to connect short-range wireless communication using the short-range wireless communication I/F 316. In step S1005, the MFP-linkage management application 703 waits for establishment of connection of short-range wireless communication with the MFP 101, and if the connection is established, the processing proceeds to step S1006. The communication between the MFP 101 and the mobile terminal 102 is performed using short-range wireless communication unless otherwise specified.

In step S1006, the MFP-linkage management application 703 instructs the MFP 101 to give a notification (a notification request) necessary for processing after the linking to the mobile terminal 102. In the present embodiment, the notification necessary for the linking includes "completion of execution of the link button" and "request for unlinking".

In step S1007, the MFP-linkage management application 703 sends a request to obtain link information to the MFP 101. The link information is information necessary for the mobile terminal 102 to link to the MFP 101, for example, the user ID of a user who logs in the MFP 101, the IP address of the management server 103, and identification information on the MFP 101. In step S1008, the MFP-linkage management application 703 receives link information from the MFP 101 as a response to step S1007.

In step S1009, the MFP-linkage management application 703 identifies a mobile application displayed on the screen of the operating unit 318 or in the foreground. In step S1010, the MFP-linkage management application 703 determines whether the identified mobile application is the link target of the MFP 101 depending on whether it responds to a predetermined inquiry. If the identified mobile application is the link target, the MFP-linkage management application 703 advances the processing to step S1011, and if not, terminates the processing. The method of determination on the link target is a mere example. Another method may be used for determination. For example, a list of mobile applications to be linked to may be stored in the mobile terminal 102 in advance, or an inquiry to the management server 103 may be used. Hereinafter the mobile application identified in step S1009 is referred to as "target application".

In step S1011, the MFP-linkage management application 703 sends an inquiry to the target application and obtains target app data from the target application. The target app data is data necessary for the target application to link to the MFP 101 and differs according to the target application. For example, in the case of a mobile application for managing a cloud storage, the target app data is an identifier indicating a folder that is displayed at present, and for a document creation application, the target app data is print data for printing a document that is created at present. The number of target app data is not limited to one but may be two or more. Alternative configuration may be used in which the target app data is obtained only when the target application is the link target of the MFP 101.

In step S1012, the MFP-linkage management application 703 sends the identifier of the target application, the target app data, user ID, identification information on the MFP 101, and so on to the mobile-app linking unit 803 of the management server 103 to instruct the management server 103 to create a link button. In the present embodiment, the management server 103 with an IP address included in the link information obtained in step S1008 is used as a destination. Alternatively, the IP address of the management server 103 may be set in advance in the MFP-linkage management application 703 as the destination.

In step S1013, the MFP-linkage management application 703 receives the result of creation of the link button from the mobile-app linking unit 803 of the management server 103 as a response to step S1012 and terminates the processing. The result of creation includes success or failure of the creation and the identifier (Button ID 1201) of the link button.

FIG. 10B is a flowchart for illustrating processing when the mobile terminal 102 has received a notification of completion of the execution of the link button from the MFP 101. The flowchart in FIG. 10B corresponds to the processing of the mobile terminal 102 in steps S519 to S520 of the flowchart of FIG. 5.

In step S1020, the MFP-linkage management application 703 receives a notification that execution of the link button has been completed from the MFP 101. In step S1021, the MFP-linkage management application 703 instructs the target application to perform processing after completion of the execution of the link button.

In step S1022, the instructed target application performs processing after completion of the execution of the link button. The processing necessary after completion of the execution of the link button varies according to the target application. For example, if the target application is the address book application 706, the target application displays that data has been transmitted to the displayed address. If the target application is the cloud document management application 704, the cloud document management application 704 updates the display on the file list screen to the latest state so that the MFP 101 comes into a state in which the image data uploaded to cloud is reflected.

FIG. 10C is a flowchart for illustrating processing when the mobile terminal 102 has received an unlink request from the MFP 101. The flowchart of FIG. 10C corresponds to the processing of the mobile terminal 102 in steps S522 to S523 of the sequence chart of FIG. 5.

In step S1030, the MFP-linkage management application 703 receives an unlink request from the MFP 101.

In step S1031, the MFP-linkage management application 703 disconnects the short-range wireless communication with the MFP 101.

In step S1032, the MFP-linkage management application 703 determines whether a link button is present. Whether a link button is present is determined from the result of steps S1012 to S1013 of the flowchart of FIG. 10A. If a link button is present, the MFP-linkage management application 703 advances the processing to step S1033, and if not, terminates the processing.

In step S1033, the MFP-linkage management application 703 sends the user ID and the identifier of the link button to the button managing unit 801 of the management server 103 and instructs the button managing unit 801 to delete the link button. In step S1034, the MFP-linkage management application 703 receives the result of deletion from the button managing unit 801 of the management server 103 as a response to step S1032 and terminates the processing.

The flowchart of FIG. 10C is processing when an unlink request is received from the MFP 101. Also, when the short-range wireless communication with the MFP 101 is disconnected for some reason, the same processing (processing after step S1032) is performed.

Figure 11C:
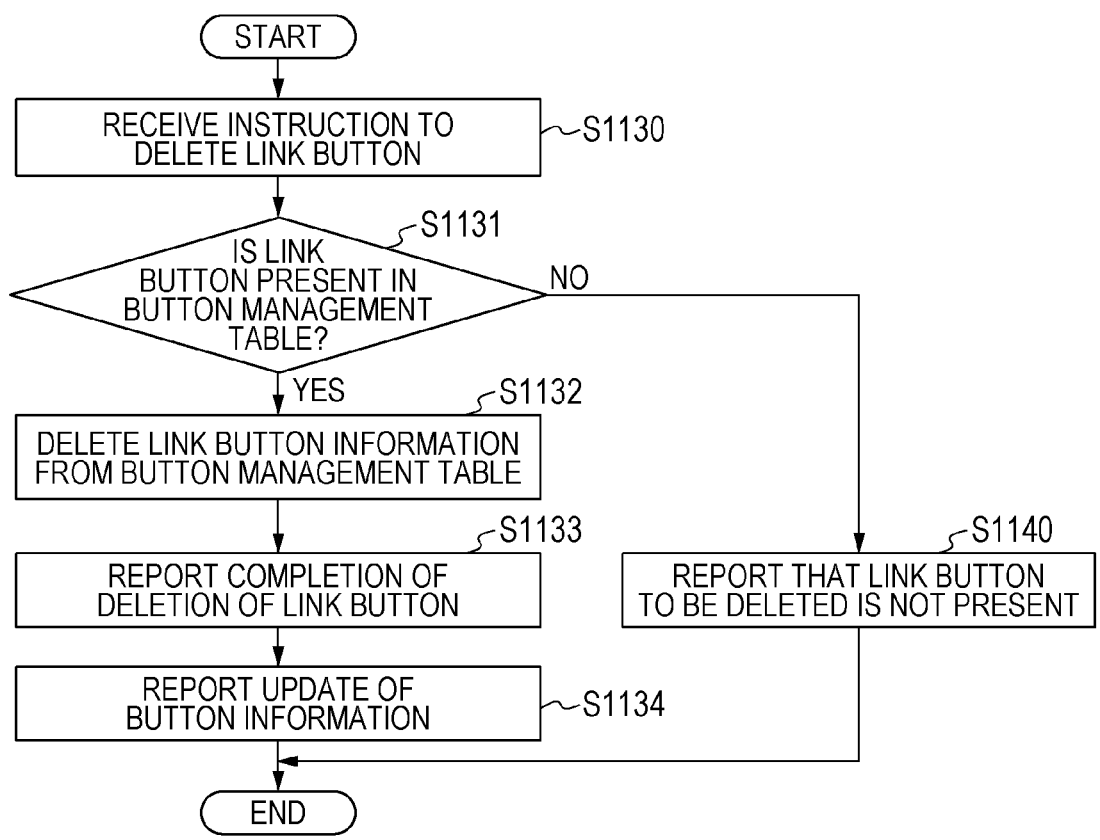
FIG. 11C is a flowchart illustrating processing of the management server according to an embodiment.

FIGS. 11A to 11C are flowcharts for illustrating the processing performed by the management server 103 in the present embodiment. The steps of the flowcharts of FIGS. 11A to 11C are executed by the CPU 411 reading the programs stored in the ROM 412 and the HDD 414 of the management server 103 into the RAM 413 and executing them.

FIG. 11A is a flowchart for illustrating processing when the management server 103 has received a request to obtain app button information from the MFP 101. The flowchart of FIG. 11A corresponds to the processing of the management server 103 in steps S502, S512, and S526 of the sequence chart of FIG. 5.

In step S1101, the button managing unit 801 receives a request to obtain app button information from the MFP 101. The acquisition request includes user ID.

In step S1102, the button managing unit 801 extracts information on app buttons corresponding to the user ID included in the acquisition request with reference to the button management table 802. If the user ID is "u001", the app button information extracted includes information on six app buttons, five Shared buttons defined in rows b001 to b005 and one Personal button defined in row b101. In addition, if a link button has been created, information on the link button in row b201 is also extracted.

In step S1103, the button managing unit 801 transmits the extracted app button information to the MFP 101 as a response to step S1101 and terminates the processing.

FIG. 11B is a flowchart for illustrating processing when the management server 103 has received an instruction to create a link button from the mobile terminal 102. The flowchart of FIG. 11B corresponds to the processing of the management server 103 in steps S509 to S511 of the sequence chart of FIG. 5.

In step S1110, the mobile-app linking unit 803 receives the instruction to create a link button from the mobile terminal 102. The creation instruction includes the identifier of the target application, target app data, user ID, and identification information on the MFP 101.

In step S1111, the mobile-app linking unit 803 extracts information corresponding to the target application from the mobile-app link table 804. Specifically, the mobile-app linking unit 803 extracts the same record as the identifier of the target application whose value in column Mobile App ID 1302 is included in the creation instruction. For example, if the identifier of the target application is "WebDrive", row m001 is obtained as the extraction result.

In step S1112, the mobile-app linking unit 803 determines whether the information corresponding to the target application has been extracted in step S1111. If the link information has been extracted, the mobile-app linking unit 803 advances the processing to step S1113, and if not, sends an error to the mobile terminal 102 in step S1120 and terminates the processing.

In step S1113, the mobile-app linking unit 803 generates information for registering a link button with the button management table 802 on the basis of the creation instruction received in step S1110 and the corresponding information extracted in step S1111.

In step S1114, the button managing unit 801 registers the generated link button information with the button management table 802. For example, if the creation instruction received in step S1110 includes the identifier "WebDrive" of the target application, target app data "current path=/my/folder", and user ID "u001", row b201 is formed on the button management table 802.

The Button ID 1201 is taken with the button managing unit 801. Button Type 1202 shows "MobileLink" indicating that the button is a link button. Button Name 1203 shows a value obtained by substituting the variable of Button Name 1303 in the mobile-app link table 804 with the value of the target app data. Target Type 1204 shows the value of Target Type 1304 in the mobile-app link table 804. Button Target 1205 shows the value of Button Target 1305 in the mobile-app link table 804. Button Parameter 1206 shows the value of Button Parameter 1306 in the mobile-app link table 804, the value of Mobile Param Name 1307, and Mobile Param Key 1308 substituted with target app data. In View Order 1207, the value "−1" is set so that the link button is displayed at the top of the menu screen of the MFP 101. User ID 1208 shows user ID included in the creation instruction received in step S1110.

Although the present embodiment uses the mobile-app link table 804 to create a link button, the link button may also be created without using the mobile-app link table 804. For example, all information necessary to register the link button in the button management table 802 may be included in the target app data that the MFP-linkage management application 703 obtains from the target application in step S1011 of FIG. 10A.

In step S1115, the mobile-app linking unit 803 notifies the mobile terminal 102 of the result of creation of the link button as a response to step S1110. The result of creation includes success or failure of the creation and the identifier (Button ID 1201) of the link button.

In step S1116, the button managing unit 801 notifies the MFP 101 that the button information has been updated and terminates the processing.

FIG. 11C is a flowchart for illustrating processing when the management server 103 has received an instruction to delete the link button from the mobile terminal 102. The flowchart of FIG. 11C corresponds to the processing of the management server 103 in steps S523 to S525 of the sequence chart of FIG. 5.

In step S1130, the button managing unit 801 receives an instruction to delete the link button from the mobile terminal 102. The delete instruction includes the identifier of the link button and user ID. In step S1131, the button managing unit 801 determines whether information on a link button corresponding to the delete instruction is present in the button management table 802. Specifically, the button managing unit 801 determines whether a record in which Button ID 1201 matches the value of the identifier of the link button received in step S1130 is present. If information on the link button is present, the button managing unit 801 advances the processing to step S1132, and if not, in step S1140, notifies the mobile terminal 102 of the fact that there is no button to be deleted and terminates the processing.

In step S1132, the button managing unit 801 deletes the record of the link button corresponding to the deletion instruction from the button management table 802 in step S1130.

In step S1133, the mobile-app linking unit 803 notifies the mobile terminal 102 of the result of deletion of the link button as a response to step S1130. In step S1134, the button managing unit 801 notifies the MFP 101 that the button information has been updated and terminates the processing.

Thus, a function corresponding to a mobile application displayed on the screen of a mobile terminal or in the foreground can be executed on an MFP only by the user placing the mobile terminal on a predetermined place of the MFP according to the procedure described in the present embodiment without the need for complicated processing. Although the present embodiment illustrates a configuration in which the user logs in the MFP 101, there is no need to necessarily log in the MFP 101. The link button may be displayed by processing as "guest" without using user ID. In the present embodiment, the mobile terminal 102 gives an instruction to create a link button. This is given for mere illustrative purposes. The MFP 101 may give an instruction to create a link button. In this case, the mobile terminal 102 sends the target application and target app data to the MFP 101, and the MFP 101 gives an instruction to create a link button to the management server on the basis of the given information.

Second Embodiment

The first embodiment illustrates an example in which one link button corresponding to a mobile application displayed on the screen of the mobile terminal 102 or in the foreground is created. However, the link button to be created can differ depending on the status of the mobile application. It may be better to create a plurality of link buttons not only one. A specific example will be given in which the target application is a cloud photo management application. If the path of the cloud is displayed on the mobile terminal 102, it is supposed that an image scanned with the MFP 101 is stored in the path. If document data stored in the cloud is displayed on the mobile terminal 102, it is supposed that the document data is printed with the MFP 101. Thus, even for the same application, the link button to be created may be changed according to the status of the application.

A second embodiment is configured such that a plurality of link buttons are created according to the mobile application displayed on the screen of the mobile terminal 102 or in the foreground and its status. Since the second embodiment is a modification of the first embodiment, only the difference will be described.

The processing of the mobile terminal 102 in the second embodiment will be described. In step S1011 of FIG. 10A, the MFP-linkage management application 703 sends an inquiry to a target application and obtains target app data from the target application. At that time, the MFP-linkage management application 703 obtains the status of the target application as part of the target app data. The status of the target application may be based on the target app data. In step S1012, the MFP-linkage management application 703 sends the identifier of the target application, the target app data including the status of the target application, and user ID to the mobile-app linking unit 803 of the management server 103 and instructs the management server 103 to create a link button.

Next, the processing of the management server 103 in the second embodiment will be described. In step S1110 of FIG. 11B, the mobile-app linking unit 803 receives the instruction to create a link button from the mobile terminal 102. The creation instruction includes the identifier of the target application, the target app data including the status of the target application, and user ID. In step S1111, the mobile-app linking unit 803 extracts information corresponding to the status of the target application from the mobile-app link table 804.

FIG. 15 illustrates a mobile-app link table 804 in the second embodiment. The difference from the mobile-app link table 804 in the first embodiment is that Mobile App Status 1501 is added. Since columns 1301 to 1308 are the same as those of the first embodiment, descriptions will be omitted. Mobile App Status 1501 is a column that defines the statuses of the mobile applications defined by Mobile App ID 1302.

For example, rows m101 and m102 define information on link buttons created when cloud document management applications whose identifiers are "WebDrive" are displayed, but information on different link buttons according to the status of the mobile applications in column 1501 are defined (if the status of the application is "path view", "scan and store" is defined, and for "document view", "print document data" is defined). In rows m103 and m104, multiple link buttons are created even though the values of Mobile App ID 1302 and the values of Mobile App Status 1501 are respectively the same, and the statuses of the applications are the same. Specifically, when the cloud photo management application 705 whose identifier is "PhotoBox" is album mode (AlbumMode), two link buttons are created for the information defined in row m103 and row m104. The link button created on the basis of the information in row m103 is an app button for adding image data scanned with the MFP 101 to an album that the cloud photo management application 705 displays on the mobile terminal 102. The link button created on the basis of the information in row m104 is an app button for printing the thumbnail of a picture included in the album that the cloud photo management application 705 displays on the mobile terminal 102 using the MFP 101.

FIG. 16 illustrates part of a button management table 802 of the second embodiment in the case where multiple link buttons are created for the same status of applications, in which information on two app buttons is registered as link buttons. The button management table 802 further includes the records illustrated in FIG. 12A. Row b301 indicates information on a link button created on the basis of row m103 in the mobile-app link table 804 illustrated in FIG. 15. Row b302 indicates information on a link button created on the basis of row m104 in the mobile-app link table 804 of FIG. 15.

Figure 17:
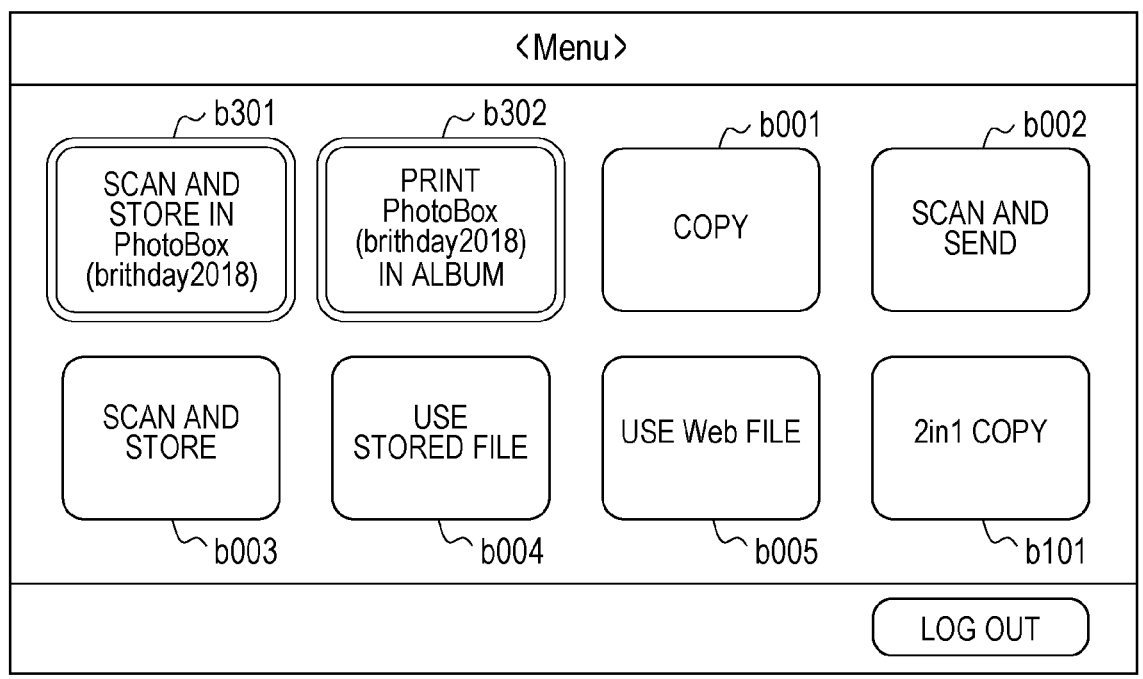
FIG. 17 illustrates an example of a menu screen displayed on the operating unit of the MFP according to the second embodiment.

FIG. 17 illustrates an example of a menu screen in the second embodiment. The menu screen displays the two link buttons defined in rows b301 and b302, the five Shared buttons defined in rows b001 to b005, and the one Personal button defined in row b101, eight app buttons in total, in the order defined by View Order 1207.

Thus, processing according to the status of a mobile application displayed on the screen of a mobile terminal or in the foreground can be executed by an MFP when the MFP and the mobile terminal communicate with each other according the procedure described in the present embodiment, increasing the user convenience.

Third Embodiment

The first and second embodiments illustrate a system configuration in which the app buttons to be displayed on the menu screen of the MFP 101 are managed by the management server 103. This has an advantage in that, when multiple MFPs are present, the same menu screen can be displayed on any MFP by managing the app buttons with the management server 103. However, if only one MFP is present or if the same menu screen is not used by a plurality of MFPs, management with the management server 103 is not necessarily needed. A third embodiment illustrates a configuration in which the management server 103 is omitted. Since the third embodiment is a modification of the first embodiment, only the difference will be described.

Figure 18:
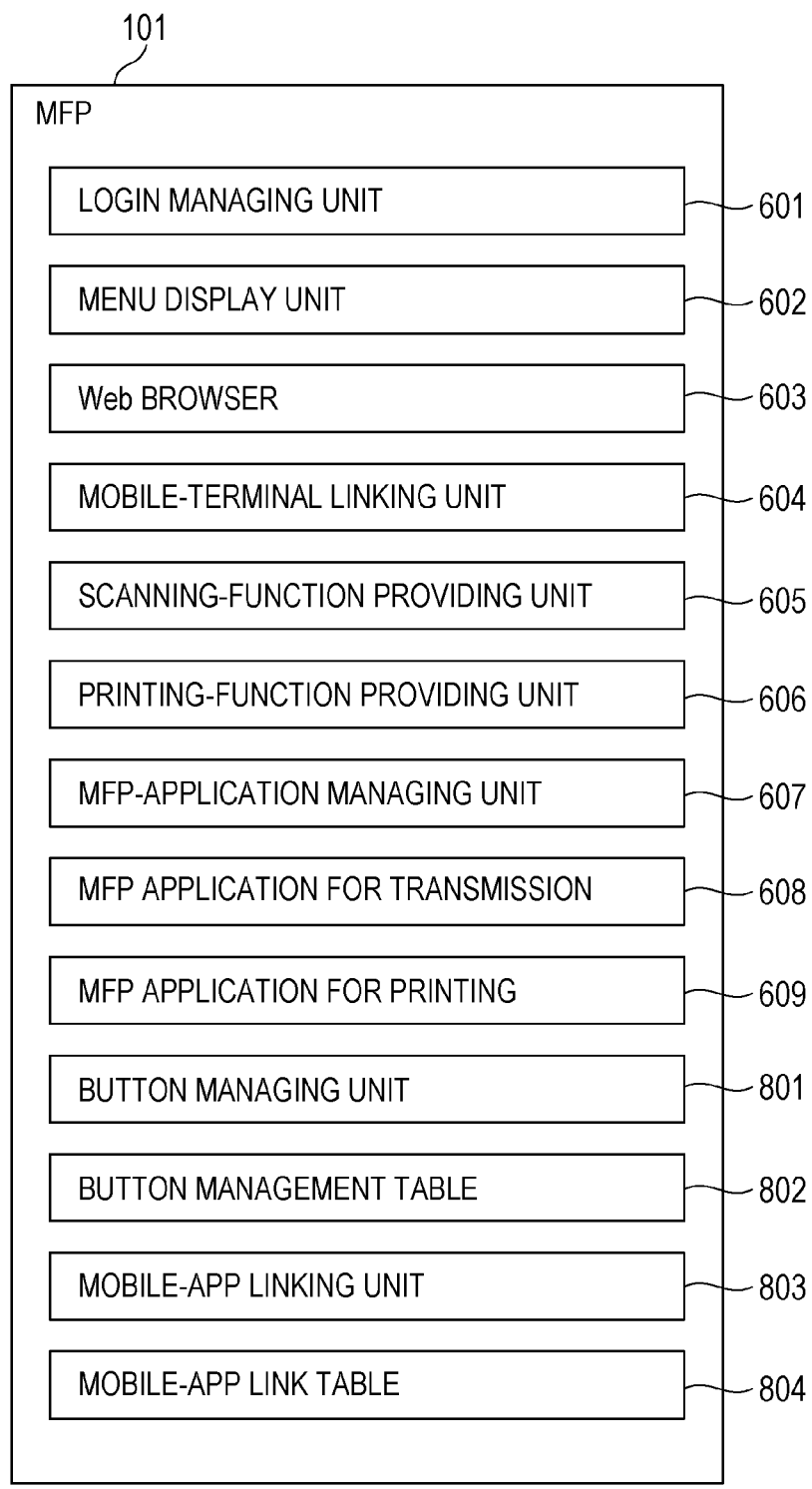
FIG. 18 is a block diagram illustrating the software configuration of an MFP according to a third embodiment.

FIG. 18 is a diagram illustrating the software configuration of an MFP 101 of the third embodiment. The software configuration is a combination of the software configuration of the MFP 101 of the first embodiment and the software and the tables of the management server 103.

In the third embodiment, the entire processing performed by the management server 103 in the first embodiment is performed by the MFP 101. In other words, the processing of the flowcharts of FIGS. 11A to 11C is performed by the MFP 101.

Since the MFP 101 performs the same processing as the processing of the management server 103, the mobile-terminal linking unit 604 sends the IP address of the MFP 101 to the mobile terminal 102, instead of the IP address of the management server 103 in step S926 of FIG. 9B. Thus, the communication of the mobile terminal 102 with the management server 103 in the first embodiment is replaced with communication with the MFP 101 in the third embodiment.

Alternatively, the communication between the mobile terminal 102 and the MFP 101 serving as a management server may be direct communication using short-range wireless communication without using a network I/F. In that case, the link button may be displayed on the menu screen currently displayed on the MFP 101 without the need for specifying the user.

Thus, even without a management server, processing similar to those of the first and second embodiments can be performed according to the procedure described in this embodiment.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-126342, filed Jul. 5, 2019, which is hereby incorporated by reference herein in its entirety.

What is claimed is:

1. A system comprising:
an apparatus;
a server configured to communicate with the apparatus; and
a terminal capable of executing an application,
wherein the terminal includes
a first memory; and
a first processor in communication with the first memory, wherein the first processor performs:
obtaining an identifier of an application executed on the terminal; and
transmitting the obtained identifier of the application to the server,
wherein the server includes
a storage storing an identifier of an application and information indicating a predetermined process in association with each other, wherein the predetermined process is a process using a function included in the apparatus;
a second memory; and
a second processor in communication with the second memory, wherein the second processor performs:
receiving the transmitted identifier of the application from the terminal; and
transmitting the information indicating the predetermined process which is associated with the received identifier of the application to the apparatus, and
wherein the apparatus includes
a third memory; and
a third processor in communication with the third memory, wherein the third processor performs:
receiving the transmitted information indicating the predetermined process from the server; and
executing the predetermined process corresponding to the received information indicating the predetermined process.

2. The system according to claim 1, wherein the first processor further performs:
short-range wireless communication with the apparatus,
wherein, as the short-range wireless communication is established between the terminal and the apparatus, the terminal transmits the obtained identifier of the application to the server, and the information indicating the predetermined process corresponding to the received identifier of the application is transmitted from the server to the apparatus.

3. The system according to claim 1, wherein the third processor further performs:
displaying a button for calling up the predetermined process on a display unit based on the received information indicating the predetermined process; and
when the displayed button is pressed, executing the predetermined process.

4. The system according to claim 1, wherein in the obtaining, data in which the application executed on the terminal is open or to be processed is further obtained, wherein the predetermined process is a process for the data.

5. The system according to claim 1, wherein the predetermined process is a printing process or a storing process of image data.

6. The system according to claim 1, wherein in the transmitting the obtained identifier of the application to the server, the identifier of the application satisfying a predetermined condition is transmitted, wherein, when the terminal begins to communicate with the apparatus, the predetermined condition is that the application is displayed on a screen of the terminal or executed in foreground of the terminal.

7. The system according to claim 1, wherein the storage associates and stores different information indicating a predetermined process with each of a plurality of status of the application.

8. The system according to claim 1, wherein the predetermined process is a process executing a Web application.

9. The system according to claim 1, wherein the predetermined process is a printing process printing, by the apparatus, image data on the application executed in the terminal, or a storing process storing, by the apparatus, image data to a folder on the application executed in the terminal.

10. The system according to claim 1, wherein in the transmitting the obtained identifier of the application to the server, the identifier of the application satisfying a predetermined condition is transmitted, wherein the predetermined condition is that the application is linkable to the apparatus.

11. The system according to claim 2, wherein wireless LAN communication is performed based on the short-range wireless communication, wherein, in the wireless LAN communication, at least one of user information, an IP address of the server, and identification information on the apparatus is exchanged.

12. The system according to claim 2, wherein when the short-range wireless communication is started, an application for obtaining the application executed on the terminal and transmitting the server of the obtained identifier of the application is started.

13. The system according to claim 3, wherein in the displaying, a button other than the button for calling up the predetermined process is displayed on the display unit, and the button other than the button for calling up the predetermined process is displayed in different manner from the other buttons.

14. The system according to claim 3, wherein in the displaying, a button other than the button for calling up the predetermined process is displayed on the display unit, and the button other than the button for calling up the predetermined process is displayed ahead of the other buttons.

15. A system comprising:
an apparatus; and
a terminal capable of executing an application,
wherein the terminal includes
a first memory; and
a first processor in communication with the first memory, wherein the first processor performs:
obtaining an identifier of an application executed on the terminal; and
transmitting the obtained identifier of the application to the apparatus,
wherein the apparatus includes a storage storing an identifier of an application and information indicating a predetermined process in association with each other, wherein the predetermined process is a process using a function included in the apparatus;

a second memory; and a second processor in communication with the second memory, wherein the second processor performs:

specifying information indicating a predetermined process in association with the transmitted identifier of the application based on the stored information; and executing the predetermined process corresponding to the specified information indicating the predetermined process.

16. The system according to claim 15, wherein the predetermined process is a printing process or a storing process of image data.

17. The system according to claim 15, wherein in the transmitting the obtained identifier of the application to the server, the identifier of the application satisfying a predetermined condition is transmitted, wherein, when the terminal begins to communicate with the apparatus, the predetermined condition is that the application is displayed on a screen of the terminal or executed in foreground of the terminal.

18. A method for an apparatus communicating with a terminal, the method comprising:

storing an identifier of an application and information indicating a predetermined process in association with each other, wherein the predetermined process is a process using a function included in the apparatus;

specifying information indicating a predetermined process in association with the identifier of the application reported from the terminal based on the stored information; and executing the predetermined process corresponding to the specified information indicating the predetermined process.

19. A non-transitory computer-readable storage medium storing a program to cause a computer to perform a method for an apparatus communicating with a terminal, the method comprising:

storing an identifier of an application and information indicating a predetermined process in association with each other, wherein the predetermined process is a process using a function included in the apparatus;

specifying information indicating a predetermined process in association with the identifier of the application reported from the terminal based on the stored information; and executing the predetermined process corresponding to the specified information indicating the predetermined process.

* * * * *